(12) United States Patent
Baron

(10) Patent No.: US 10,442,490 B2
(45) Date of Patent: *Oct. 15, 2019

(54) FULL FOLDING TRICYCLE

(71) Applicant: SMART TRIKE MNF PTE LTD., Singapore (SG)

(72) Inventor: Yoram Baron, Moshav Nir Israel (IL)

(73) Assignee: SMART TRIKE MNF PTE LTD., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 15/964,802

(22) Filed: Apr. 27, 2018

(65) Prior Publication Data

US 2018/0244335 A1     Aug. 30, 2018

Related U.S. Application Data

(63) Continuation-in-part of application No. 15/363,202, filed on Nov. 29, 2016, now Pat. No. 9,981,679, and (Continued)

(51) Int. Cl.
  *B62B 1/00* (2006.01)
  *B62K 15/00* (2006.01)
  (Continued)

(52) U.S. Cl.
  CPC ............ *B62K 15/008* (2013.01); *B62B 1/002* (2013.01); *B62B 1/12* (2013.01); *B62B 7/044* (2013.01);
  (Continued)

(58) Field of Classification Search
  CPC .......... B62K 15/008; B62K 5/06; B62K 9/02; B62B 7/12; B62B 2015/003; B62B 2015/005

See application file for complete search history.

(56) References Cited

U.S. PATENT DOCUMENTS 2,194,161 A   3/1940   Cob
2,169,364 A   11/1952  Carson
(Continued)

FOREIGN PATENT DOCUMENTS

CN   105480342 A   4/2016
CN   105501355 A   4/2016
(Continued)

OTHER PUBLICATIONS

Notification of the Transmittal of the International Search Report and the Written Opinion of the International Searching Authority, of the Declaration for PCT/IB2017/055266—a counterpart foreign application—dated Jan. 24, 2018; 1 page.
(Continued)

*Primary Examiner* — Hau V Phan
(74) *Attorney, Agent, or Firm* — Roach Brown McCarthy Kevin & Gruber, P.C.; Kevin D. McCarthy

(57) ABSTRACT

The present invention relates to a foldable tricycle, operable between a first mode of operation steerable by a tricycle rider, and a second mode of operation steerable by an attendant pushing the tricycle. The tricycle comprising: a pair of rear wheels; a foldable seat comprising a chair and a back support, for accommodating said tricycle rider; a foldable arm rest, connected to said foldable seat; a parental handle, for steering said tricycle by said attendant pushing the tricycle; a main frame, configured to rotatably hold said rear support, to support said foldable seat, to rotatably support said rider handle, to rotatably support said fork; and a latching mechanism, capable of locking and unlocking the rotatable movement, of the rear support, in relations to the main frame.

16 Claims, 21 Drawing Sheets

Related U.S. Application Data a continuation-in-part of application No. PCT/IB2017/055266, filed on Sep. 1, 2017.

(60) Provisional application No. 62/394,238, filed on Sep. 14, 2016.

(51) Int. Cl.
  *B62K 9/02* (2006.01)
  *B62B 7/12* (2006.01)
  *B62M 1/24* (2013.01)
  *B62K 5/06* (2006.01)
  *B62M 1/38* (2013.01)
  *B62J 17/08* (2006.01)
  *B62B 7/08* (2006.01)
  *B62B 1/12* (2006.01)
  *B62B 7/04* (2006.01)

(52) U.S. Cl.
  CPC ............... *B62B 7/08* (2013.01); *B62B 7/12* (2013.01); *B62J 17/08* (2013.01); *B62K 5/06* (2013.01); *B62K 9/02* (2013.01); *B62M 1/24* (2013.01); *B62M 1/38* (2013.01); *B62B 2206/006* (2013.01); *B62K 2015/003* (2013.01); *B62K 2015/005* (2013.01)

(56) References Cited

U.S. PATENT DOCUMENTS

| | | | |
|---|---|---|---|
| 2,806,709 | A | 9/1957 | Watson |
| 2,914,336 | A | 11/1959 | Hibben, Jr. et al. |
| 3,265,402 | A | 8/1966 | Snyder |
| 3,905,618 | A | 9/1975 | Miranda |
| 4,142,736 | A | 3/1979 | Ackerfeldt et al. |
| 4,457,529 | A | 7/1984 | Shamie et al. |
| 4,474,388 | A | 10/1984 | Wagner |
| 5,074,577 | A | 12/1991 | Cheng |
| 5,087,040 | A | 2/1992 | Cheng |
| RE33,939 | E | 5/1992 | Cheng |
| 5,201,540 | A | 4/1993 | Wu |
| 5,409,253 | A | 4/1995 | Cheng |
| 5,586,778 | A | 12/1996 | Lindh et al. |
| 5,590,896 | A | 1/1997 | Eichhorn |
| 5,660,435 | A | 8/1997 | Eichhorn |
| 5,667,239 | A | 9/1997 | Yang |
| 5,765,857 | A | 6/1998 | Hsiao |
| 5,829,585 | A | 11/1998 | Kao et al. |
| 5,887,889 | A | 3/1999 | Andrus |
| 6,007,031 | A | 12/1999 | Tang |
| 6,079,718 | A | 6/2000 | Liao |
| 6,102,431 | A | 8/2000 | Sutherland et al. |
| 6,105,998 | A | 8/2000 | Baechler et al. |
| 6,152,473 | A | 11/2000 | Shih |
| 6,152,476 | A | 11/2000 | Huang |
| 6,155,579 | A | 12/2000 | Eyman et al. |
| 6,299,194 | B1 | 10/2001 | Chen |
| 6,533,311 | B2 | 3/2003 | Kaneko et al. |
| 6,575,486 | B2 | 6/2003 | Ma |
| 6,609,723 | B2 | 8/2003 | Chuang |
| 6,682,090 | B2 | 1/2004 | Chen |
| 6,719,319 | B2 | 4/2004 | Liao |
| 6,722,690 | B2 | 4/2004 | Lan |
| 6,739,616 | B2 | 5/2004 | Lin |
| 6,767,028 | B2 | 7/2004 | Britton et al. |
| 6,789,808 | B2 | 9/2004 | Yang |
| 6,811,173 | B1 | 11/2004 | Shih |
| 6,869,096 | B2 | 3/2005 | Allen et al. |
| 6,874,802 | B2 | 4/2005 | Gunter et al. |
| 6,935,649 | B2 | 8/2005 | Lim |
| 6,966,572 | B2 | 11/2005 | Michelau et al. |
| 7,000,928 | B2 | 2/2006 | Liao |
| 7,000,935 | B2 | 2/2006 | Gunter et al. |
| 7,000,939 | B2 | 2/2006 | Shapiro |
| 7,077,420 | B1 | 7/2006 | Santoski |
| 7,128,333 | B2 | 10/2006 | Reimers et al. |
| 7,137,644 | B2 | 11/2006 | Kimberley |
| 7,219,920 | B2 | 5/2007 | Lin |
| 7,281,725 | B1 | 10/2007 | Gunter et al. |
| 7,296,819 | B2 | 11/2007 | Cunningham |
| 7,300,066 | B2 | 11/2007 | Kettler et al. |
| 7,347,443 | B2 | 3/2008 | Barton |
| D571,866 | S | 6/2008 | On |
| 7,390,012 | B2 | 6/2008 | Church |
| 7,396,039 | B2 | 7/2008 | Valdez et al. |
| 7,422,230 | B2 | 9/2008 | Chuan |
| 7,591,479 | B2 | 9/2009 | Golias |
| D604,777 | S | 11/2009 | On |
| 7,632,035 | B2 | 12/2009 | Cheng |
| 7,658,252 | B2 | 2/2010 | Shapiro |
| 7,694,980 | B2 | 4/2010 | Dotsey et al. |
| 7,766,359 | B2 | 8/2010 | Klevana et al. |
| 7,798,515 | B2 | 9/2010 | Valdez et al. |
| 7,871,099 | B2 | 1/2011 | Gilbertson et al. |
| 7,909,353 | B2 | 3/2011 | Nolan et al. |
| 7,934,729 | B2 | 5/2011 | Murphy et al. |
| 8,061,732 | B2 | 11/2011 | Song et al. |
| 8,104,777 | B2 | 1/2012 | Zhang |
| 8,191,920 | B2 | 6/2012 | Zhang |
| 8,226,111 | B2 | 7/2012 | Valdez et al. |
| 9,114,842 | B2 | 8/2015 | Bartels |
| 9,580,131 | B1 | 2/2017 | Wu |
| 9,981,679 | B2 * | 5/2018 | Baron ............... B62K 15/008 |
| 2002/0093177 | A1 | 7/2002 | Chen |
| 2003/0098567 | A1 | 5/2003 | Chuang |
| 2003/0141695 | A1 | 7/2003 | Chen |
| 2003/0201621 | A1 | 10/2003 | Jang |
| 2004/0256164 | A1 | 12/2004 | Huang |
| 2005/0035646 | A1 | 2/2005 | Everett |
| 2008/0277901 | A1 | 11/2008 | Catelli |
| 2009/0008164 | A1 | 1/2009 | Shapiro |
| 2009/0115151 | A1 | 5/2009 | Van Dijk |
| 2010/0308550 | A1 | 12/2010 | Li et al. |
| 2010/0308561 | A1 | 12/2010 | Diekman et al. |
| 2010/0314855 | A1 | 12/2010 | Mival et al. |
| 2011/0012325 | A1 | 1/2011 | Gower et al. |
| 2011/0074125 | A1 | 3/2011 | Aiken et al. |
| 2012/0104712 | A1 | 5/2012 | Kobayashi |
| 2013/0056949 | A1 | 3/2013 | Bricker |
| 2014/0103616 | A1 | 4/2014 | Young |
| 2014/0138932 | A1 * | 5/2014 | Baron ............... H05K 999/99 280/279 |

FOREIGN PATENT DOCUMENTS

| | | | |
|---|---|---|---|
| EP | 1937541 | B1 | 6/2010 |
| JP | 2004099021 | A | 4/2004 |
| JP | 2003320983 | B2 | 1/2006 |
| JP | 2006111222 | A | 4/2006 |
| WO | 2007/038951 | A1 | 4/2007 |
| WO | 2014/033503 | A1 | 3/2014 |

OTHER PUBLICATIONS

International Search Report for PCT/IB2017/055266—a counterpart foreign application—dated Jan. 24, 2018; 4 pages.

Written Opinion of the International Searching Authority, for PCT/IB2017/055266—a counterpart foreign application—dated Jan. 24, 2018; 6 pages.

* cited by examiner

FULL FOLDING TRICYCLE

TECHNICAL FIELD

The present invention relates to the field of riding vehicles. More particularly, the invention relates to a foldable tricycle.

BACKGROUND

As of today, many types of tricycles for children exist. In a typical toy shop, one can encounter a number of tricycles differing in size, shape and color. However, shipping, handling, and storing these tricycles are becoming problems of a major nuisance, due to the relative large space these tricycles occupy. This is especially true for shipping overseas, where the tricycle's overall occupying space affects the size of the shipping containers of the tricycles which, in turn, affects the shipping costs.

This problem, of large space occupancy, can be partially resolved by a foldable tricycle design. Thus, the option of folding the tricycle, when not in use, can reduce costs, of shipping and storing, for distributers and retailers. In addition, consumers may also prefer foldable tricycles which can be easily fitted into a car trunk and can be easily stored in a storeroom.

U.S. Pat. No. 6,966,572 discloses a folding tricycle, which features a front frame element to which a front wheel and handlebars are mounted. A front bracket is attached to the front frame element and a seat bracket, to which a seat is mounted, is pivotally attached to the front bracket. A rear frame element has a pair of rear wheels mounted thereto and is attached to a rear bracket. The rear bracket is also pivotally mounted to the front bracket. The rear seat bracket features a pin that engages slots in the seat bracket. As a result, the seat bracket pivots with respect to the front bracket as the rear frame element is pivoted relative to the front bracket as the riding vehicle is moved between folded and unfolded configurations. However, the described folding technique is inefficient.

U.S. Pat. No. 7,300,066 discloses a folding frame for a tricycle which has a front frame part on which the front wheels can be mounted and a rear frame part on which the rear wheels can be mounted. A rotating joint with a front articulated part is mounted on the front frame part and a rear articulated part is mounted on the rear frame part. The first of the two articulated parts has a first recess and the second of the two articulated parts has a second and third recess. The first recess and the second recess are in alignment in the use position of use and the first recess and the third recess are aligned in the folded position. The first articulated part and the second articulated part are locked against one another in the use position and in the folded position via a pin which can be moved in the recesses. Nevertheless, the described folding system is inconvenient.

WO 2007/038951 discloses a folding tricycle for children which comprises a frame having a central part carrying at its front a head tube and connected at its rear to first ends of rear arms carrying a corresponding rotatable wheel, the first end of said arms being hinged to said central part such as to be able to assume at least two working positions, in a first position said arms extending from said central part and in a second position they cling along the side of said part. The central part of the frame comprises a portion connecting it to the arms and presenting free surfaces lying in planes inclined to a central plane of the frame and converging to the front said central part of this latter, said first end of said arms being shaped to provide a form fit with said free surfaces. Nevertheless, the described folding technique is inefficient.

WO 2014/033503 discloses a foldable tricycle which includes a front wheel assembly and a mainframe, latched to the front wheel assembly by a front mount. The disclosed tricycle also includes a pair of rear-wheel assemblies, a pair of folding ring assemblies which couples the rear-wheel assemblies to the mainframe, and a mechanism for simultaneously unlocking the pair of ring assemblies and unlatching the mainframe from the front wheel assembly. Nevertheless, the described folding technique is inefficient.

It would therefore be desired to propose a system void of these deficiencies.

SUMMARY

It is an object of the present invention to provide a foldable tricycle.

It is another object of the present invention to provide a foldable tricycle that can be folded into a small package.

It is still another object of the present invention to provide a foldable tricycle that has a foldable arm rest.

It is still another object of the present invention to provide a foldable tricycle that has a parental handle, a foldable chair, a canopy and a rear bag, where the foldable tricycle can be folded together with all its parts.

It is still another object of the present invention to provide a foldable tricycle that has a parental handle, and where the handle is also foldable.

It is still another object of the present invention to provide a foldable tricycle that can be rolled around as a trolley.

Other objects and advantages of the invention will become apparent as the description proceeds.

The present invention relates to a foldable tricycle, operable between a first mode of operation steerable by a tricycle rider, and a second mode of operation steerable by an attendant pushing the tricycle, the tricycle comprising: (a) a pair of rear wheels; (b) a front wheel having a front wheel axis; (c) a head tube; (d) a fork for rotatably supporting said front wheel in a manner permitting said front wheel to rotate about said front wheel axis; (e) a foldable seat, comprising a chair and a back support, for accommodating said tricycle rider; (f) a foldable arm rest, connected to said foldable seat; (g) a parental handle, for steering said tricycle by said attendant pushing the tricycle in the second mode; (h) a foldable rider handle, configured to turn the fork in a manner permitting a tricycle rider to exert forces on the rider handle and thereby turn the fork, in the first mode; (i) a main frame, configured to rotatably hold said rear support, to support said foldable seat, to rotatably support said rider handle, to rotatably support said fork; and (j) a latching mechanism, capable of locking and unlocking the rotatable movement, of said rear support in relations to said main frame; and (k) wherein said parental handle and the attached rear support are folded in relations to said frame and wherein said foldable arm rest is folded in relations to said foldable seat.

Preferably, the tricycle further comprises a rear bag.

Preferably, the tricycle further comprises a canopy.

In one embodiment, the latching mechanism has a leash.

In one embodiment, the latching mechanism has a grip.

In one embodiment, the latching mechanism comprises a bolt.

In one embodiment, the latching mechanism also comprises a spring that pushes the bolt into place.

In one embodiment, the front wheel is swivel wheel.

In one embodiment, at least one of the rear wheels is a swivel wheel.

In one embodiment, the latching mechanism comprises a pin.

In one embodiment, the latching mechanism also comprises a knob connected to the pin.

Preferably, the total dimensions of said folded tricycle do not exceed 150 cm.

Preferably, the hand rest is detachable.

Preferably, the tricycle further comprises a pair of pedals, where each pedal is configured for connection about the front wheel axis to rotate said front wheel.

In one embodiment, the pedals are foldable.

In one embodiment, the pedals are detachable.

In one embodiment, the tricycle can be folded into a trolley like folded position.

In one embodiment, the tricycle has an auxiliary wheel, for providing easier rolling when the folded tricycle is in a trolley like folded position.

In one embodiment, the seat may be turned around in 180°.

In one embodiment, the tricycle further comprises a leg rest.

In one embodiment, the tricycle further comprises a fastener and a pin for holding the tricycle in the folded position.

BRIEF DESCRIPTION OF THE DRAWINGS

The accompanying drawings, and specific references to their details, are herein used, by way of example only, to illustratively describe some of the embodiments of the invention.

In the drawings.

DETAILED DESCRIPTION

The terms "screw" "rivet" "pin" and "bolt" may be used throughout the description interchangeably and are meant to include any element that can be used for connecting more than one component, where in some of the cases may allow at least one of the components to rotate, e.g. axis like, in respect to at least one of the other components.

Hereinafter, parts, elements and components that are depicted in more than one figure are referenced by the same numerals.

The terms of "front", "rear", "down", "up", "bottom", "upper", "horizontal", "vertical", "right", "left" or any reference to sides or directions are used throughout the description for the sake of brevity alone and are relative terms only and not intended to require a particular component orientation.

Figure 1:
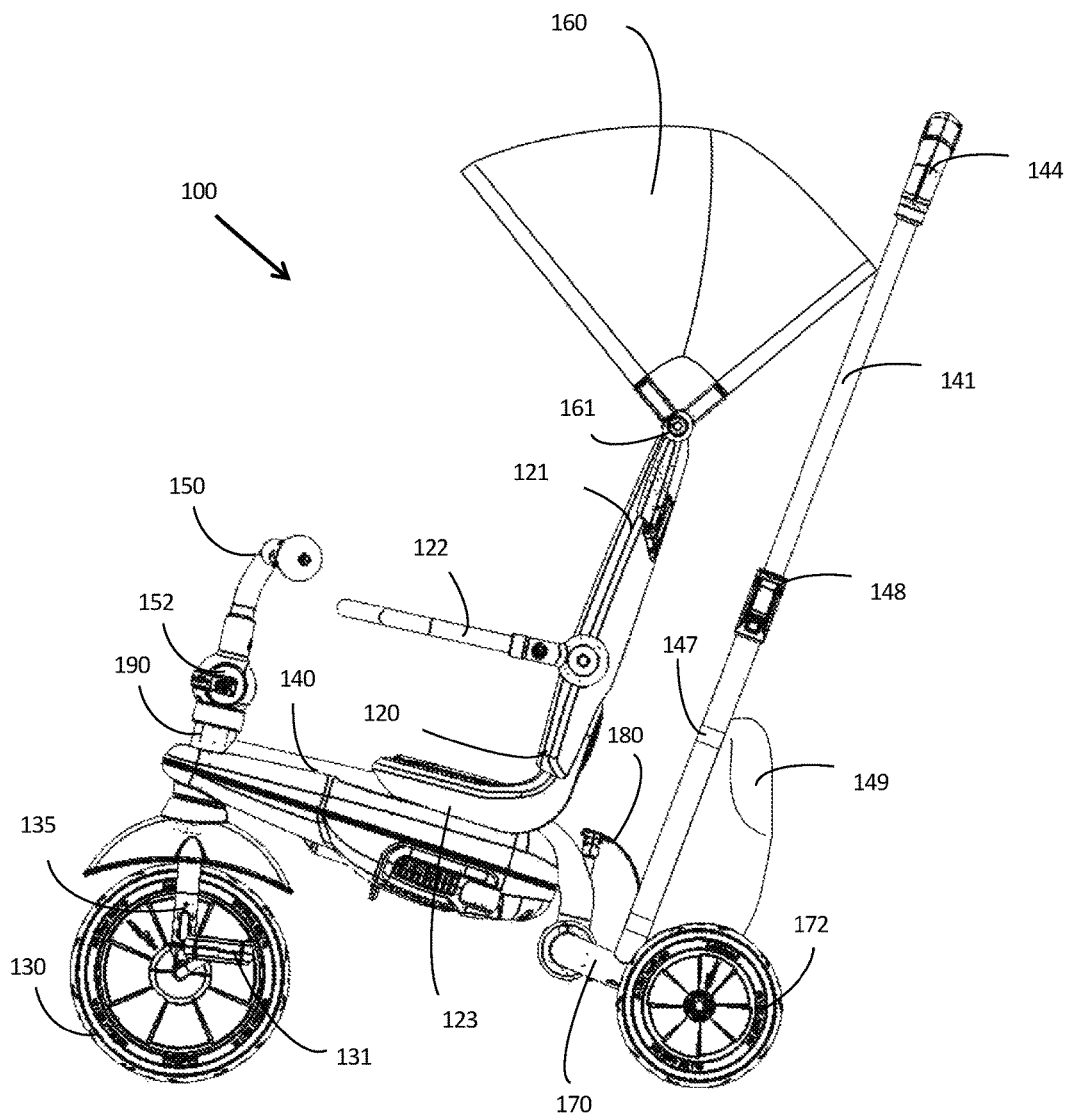
FIG. 1 is a right view diagram depicting a foldable tricycle, in its open position, i.e. unfolded configuration, according to an embodiment of the invention.

FIG. 1 is a right view diagram depicting a foldable tricycle, in its open position, i.e. unfolded configuration, according to an embodiment of the invention. A tricycle, as used herein, includes any vehicle with at least one wheel in the front and at least two wheels in the rear. The foldable tricycle 100, as depicted for example in its open position in FIG. 1, may be folded into a small package as depicted, for example, in FIG. 2.

FIG. 1, for example, depicts a view of a foldable tricycle, which may be propelled by a pedaling rider, in a first mode, or may be propelled by an attendant, who pushes the tricycle, in a second mode. The tricycle 100 may have a foldable seat 120 for accommodating the rider of the tricycle 100. The foldable seat 120 may comprise a sitting chair 123 and a foldable back support 121 for supporting the back of the rider. The chair 123 and the back support 121 may each be made of resin, plastic, or any other rigid material. In one embodiment, the chair 123 and the back support 121 may each be made of plastic covered by cloth or any other soft material. In one embodiment, a foldable arm rest 122 may be connected to the foldable seat 120. In one embodiment, the foldable arm rest 122 may be connected to the back support 121 of the foldable seat 120 by a screw, rivet, pin, or any other connecting means which may allow the rotation and folding of the arm rest 122. In one embodiment, the foldable arm rest 122 may rotate upwards, when folding, and rotate downwards, when unfolding, until the foldable arm rest 122 rests in an angle where the arm rest 122 is about parallel to chair 123. In one embodiment, the foldable arm rest 122 may be detachably connected to the back support 121, thus allowing the user to detach or attach the arm rest 122 from/to the seat 120.

The tricycle 100, as depicted in FIG. 1, may have 2 rear wheels, such as rear wheel 172 which may by rotatably supported by a rear support 170. Tricycle 100 may have at least one front wheel 130 with a front wheel axis and a pair of pedals, where each of the pedals may be configured for connection about the front wheel axis to rotate the front wheel 130. The front wheel 130 may be pedaled by the left pedal 131 and a right pedal (not shown) by a rider in the first mode. In one embodiment, the pedals may be foldable pedals. In another embodiment, the pedals may be detachable pedals.

In one embodiment, the tricycle 100 may have a foldable canopy 160 which can be opened, as depicted in FIG. 1, for protecting the rider from the sun or rain. In some embodiments the hinges of the canopy, such as hinge 161, may be used for closing and opening the canopy 160 and for folding the canopy 160 when the tricycle 100 is in the folded position, as depicted, for example, in FIG. 2. In some embodiments the hinges of the canopy, such as hinge 161, are detachable and may be used for detaching or attaching the canopy 160 from/to the seat 120.

Figure 2:
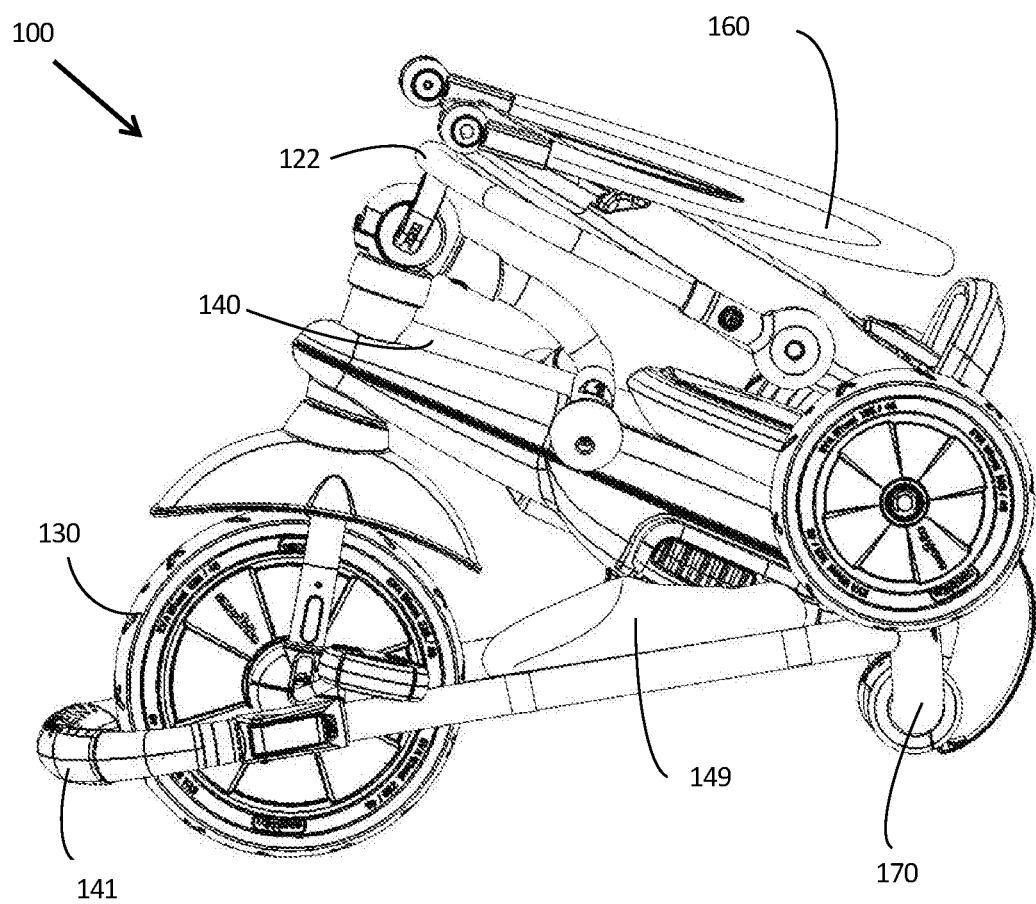
FIG. 2 is a right view diagram depicting the foldable tricycle, in its folded position, according to an embodiment.

Embodiments of the invention may also include a rider handle 150 and a fork 135, for rotatably supporting the front wheel 130, and a fork's stem (not shown). Embodiments of the invention may also include a head tube 190, for rotatably supporting the rider handle 150 and for rotatably supporting the fork's stem. In one embodiment, the front wheel 130 and its fork 135 may be detachable from the main body of the tricycle 100. In another embodiment, the front wheel 130 and/or its fork 135 may be foldable in relations to the main body of the tricycle 100. In one embodiment, the rider handle 150 may be foldable, where the base 152 may be rotatable and may fold the rider handle 150 when the tricycle is in the folded position, as depicted in FIGS. 1 and 2, for example. In one embodiment, the rider handle 150 may be partly foldable, where the base 152 may be partially rotated and may bend the rider handle 150 closer to the rider, as to accommodate a rider with shorter hands, for example.

Embodiments of the invention may also include a parental handle 141, for steering said tricycle by an attendant pushing the tricycle 100, as depicted in FIG. 1. In one embodiment, the parental handle 141 is attached to the rear support 170. In one embodiment, the parental handle 141 may have a top end 144 configured for grasping by the attendant and a bottom end having two tubes each connected to a different side of the rear support 170. An attendant who is pushing the tricycle from behind may use parental handle 141 for propelling and steering the tricycle in the second mode. In one embodiment, the parental handle 141 may be telescopically extendable, for adjusting its height to the comfortable height of the attendant, or for folding the tricycle 100. In one embodiment, the parental handle 141 may have one or more fastening clinchers, e.g. latches, such as fastening clincher 148, for clinching and fastening the height of the parental handle 141 after adjustment. Other fastening mechanisms, and other length adjustment techniques, may be used for extending the height of the parental handle 141.

In one embodiment, the main frame 140, of the tricycle 100, is configured to rotatably hold the rear support 170, to support the foldable seat 120, and to hold the head tube 190 which rotatably supports the fork's stem and the rider handle 150, as depicted in FIG. 1.

In one embodiment, tricycle 100 may also have a rear bag 149. The rear bag 149 may be attached by straps, such as strap 147, or any other method to the parental handle 141 or to any other part of the tricycle 100.

FIG. 2 is a right view diagram depicting the tricycle 100 in a folded position, according to an embodiment. In this folded position, the parental handle 141 may be rotated under the tricycle 100 toward the front wheel 130, effectively rotating the attached rear support 170 in relations to the frame 140. Thus, in one embodiment, the parental handle 141 and the attached rear support 170 are folded in relations to the frame 140. In one embodiment, the tricycle 100 may be folded together with its arm rest 122. In one embodiment, the tricycle 100 may be folded together with its canopy 160. In one embodiment, the tricycle 100 may be folded together with its rear bag 149. In yet another embodiment the tricycle 100 may be folded together with the parental handle 141. In yet another embodiment the tricycle 100 may be folded together with the parental handle 141 and the arm rest 122. In yet another embodiment the tricycle 100 may be folded together with all its depicted parts, including its arm rest 122, its canopy 160, and its rear bag 149. In one embodiment, in the folded position, the dimensions of the folded tricycle may be less than 64×47×41 cm. In one embodiment, the total dimensions of the folded tricycle do not exceed 150 cm. In another embodiment, the total dimensions of the folded tricycle, without the rear wheels, do not exceed 115 cm. In one embodiment, in the folded position, the dimensions of the folded tricycle may be between 59×42×36 cm and 69×52×46 cm. In another embodiment, the measurement of the folded tricycle, without the rear wheels and without the front wheel is about 63×31×31. In another embodiment, the measurement of the folded tricycle, without the rear wheels and without the front wheel may be between 59×27×27 cm and 69×35×35 cm.

Figure 3:
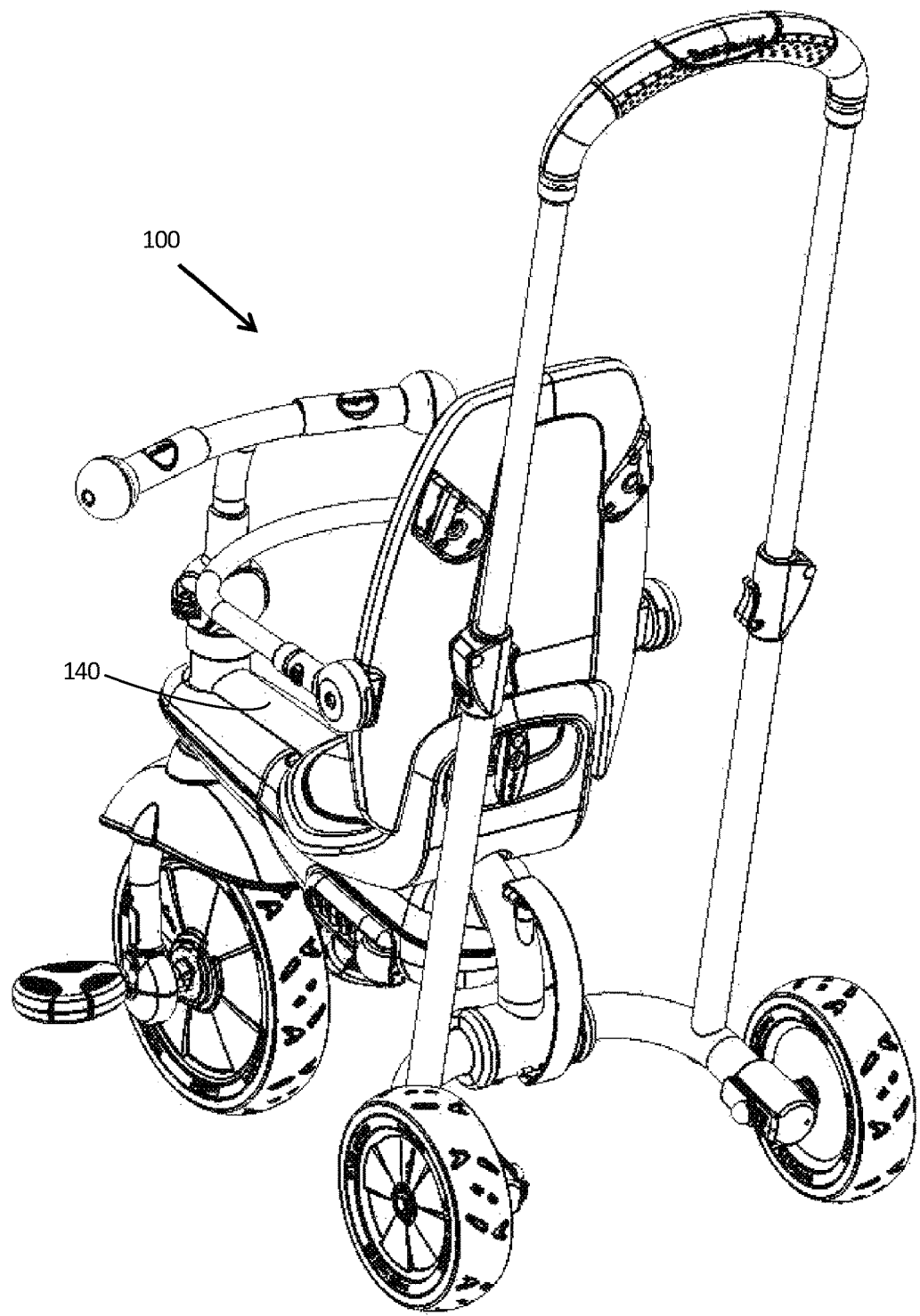
FIG. 3 is an isometric view diagram depicting a foldable tricycle, in its open position, according to an embodiment of the invention.

FIG. 3 is an isometric view diagram depicting a foldable tricycle, in its open position, according to an embodiment of the invention. In this diagram, the tricycle 100 is depicted without the canopy and without the bag. In addition, FIG. 3, illustrates a first rear wheel 172 and a second rear wheels 174 and the rear support 170. The rear support 170 has a first side 311, a second side 313 and a main support area 315 positioned between the first and second sides. The first rear wheel 172 is rotatably supported by a rear support's first side 311 distal end area 321 and the second rear wheel 174 is rotatably supported by the rear support's second side 313 distal end area 323. The parental handle 141 has a first extendable arm 331 and a second extendable arm 333. The first and second extendable arms 331, 333 are spaced apart to form a front wheel space 335. The first extendable arm 331 and the second extendable arm 333 each have a proximal end 341, 343 and a distal end 351, 353. The first extendable arm's proximal end 341 is connected to said rear support's first side 311 between the first side distal end area 321 and the main support area 315 and the second extendable arm's proximal end 343 is connected to said rear support's second side 313 between the second side distal end area 323 and the main support area 315. A top end 144 connects the distal ends 351, 353 of the first and second extendable arms 331, 333, and also forms an upper boundary of the front wheel space 335, while the rear support forms the lower boundary of the front wheel space 335.

Figure 4:
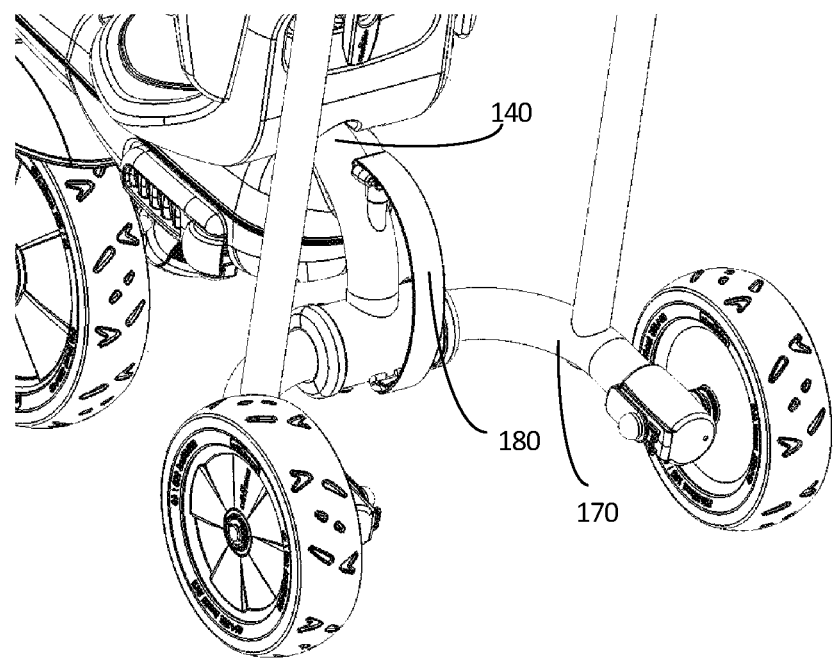
FIG. 4 is an isometric view diagram depicting the rear of the foldable tricycle, in its open position, according to an embodiment of the invention.

FIG. 4 is an isometric view diagram depicting the rear of the foldable tricycle, in its open position, as depicted in FIG. 3, according to an embodiment of the invention. In this diagram, the leash 180 may be used for folding the tricycle 100. In one embodiment, the user can pull the leash 180 and thus fold the tricycle 100 in one motion.

Figure 5:
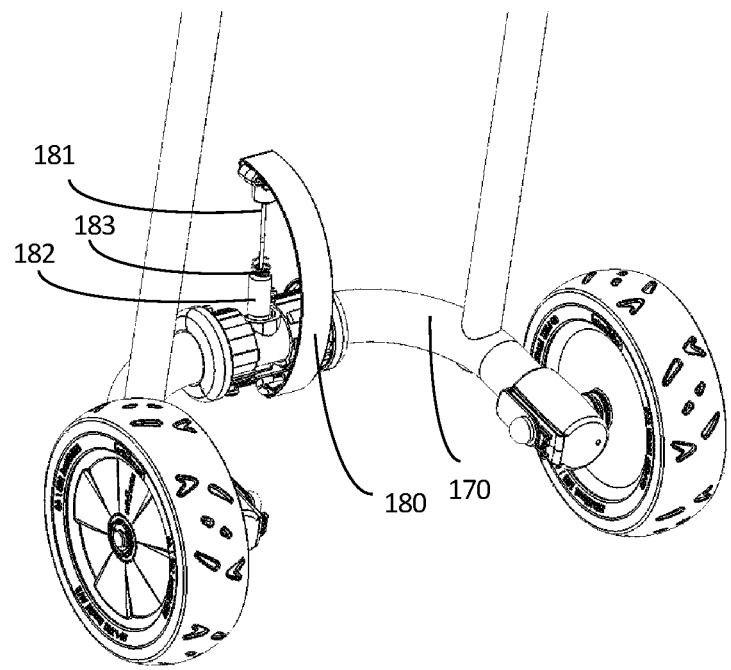
FIG. 5 is an isometric view diagram depicting a latching mechanism of the foldable tricycle, in its open position, according to an embodiment of the invention.

FIG. 5 is an isometric view diagram depicting one of the latching mechanisms of the foldable tricycle, in its open position, as depicted in FIG. 4, according to an embodiment of the invention. In this diagram, the frame 140 and some of the other external parts have been removed. As depicted, the leash 180 is connected to a cord 181 which is connected to a bolt 182. When the leash 180 is pulled—the bolt 182 is pulled from its locking position and the rear support 170 is free to rotate in relations to the frame 140, thus allowing the folding of the tricycle 100. Thus, when the leash 180 is pulled upwards, the frame 140 and the rear support 170 may each rotate downwards, due to gravity, effectively causing the tricycle 100 to fold. However, for opening and locking the tricycle 100, the tricycle 100 should be opened and the leash 180 should be released in order for the spring 183 to push the bolt 182 towards its initial position for locking the frame 140 together with the rear support 170 by insertion into predefined holes in the frame 140 and the rear support 170. In one embodiment, the rear support 170 may have 2 holes, one hole for interlocking the bolt while the tricycle 100 is in the open position and one hole for interlocking the bolt while the tricycle 100 is in the folded position. Thus, the bolt 182 may interlock the rear support 170 in relations to the frame 140 in any one of the 2 positions—open or folded.

Figure 6:
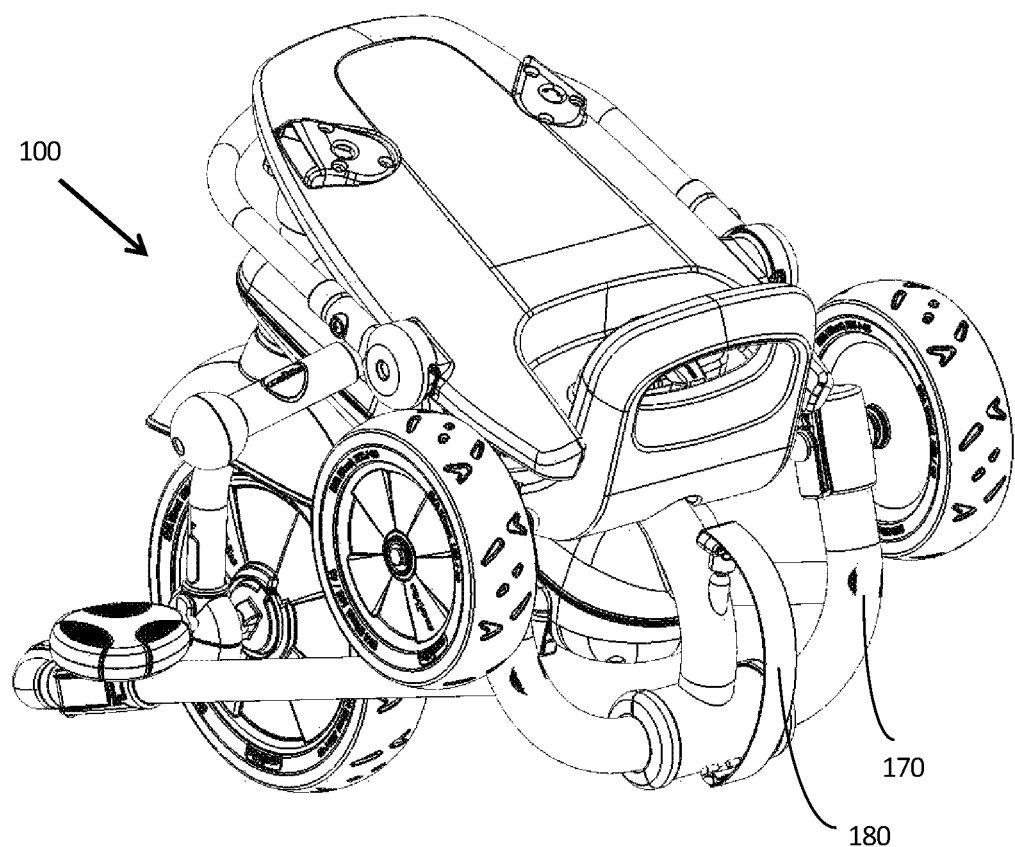
FIG. 6 is an isometric view diagram depicting a foldable tricycle, in its folded position, according to an embodiment of the invention.

FIG. 6 is an isometric view diagram depicting a foldable tricycle, in its folded position, according to an embodiment of the invention. In this diagram, the tricycle 100 is depicted without the canopy and without the bag. This figure also illustrates the embodiment when the latching mechanism is unlocked. Once unlocked, the parental handle 141 is capable of rotating under the tricycle 100 so at least a portion of the front wheel 130 passes through the front wheel space 335 while the attached rear support is folded in relation to said frame 140.

Figure 7:
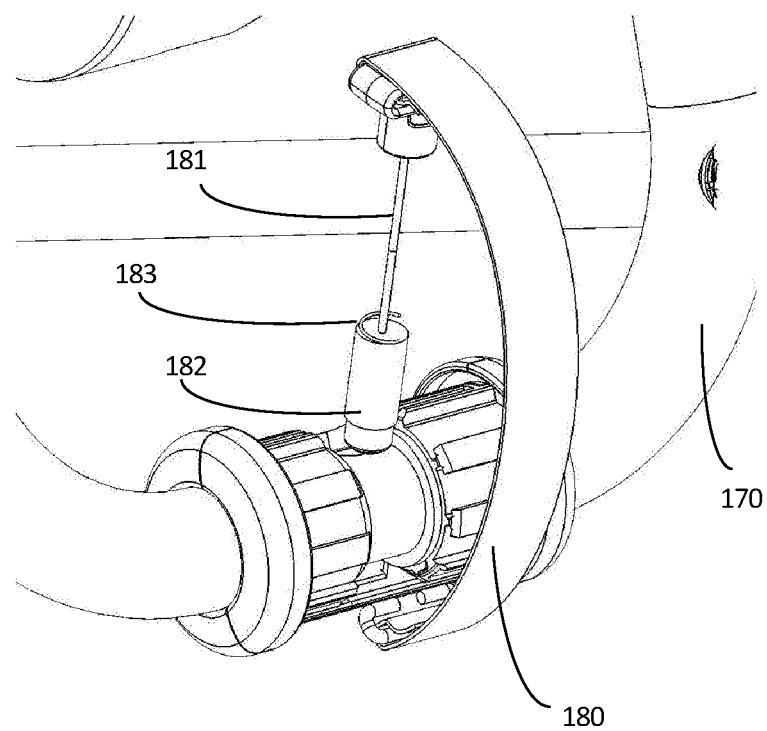
FIG. 7 is an isometric view diagram depicting a latching mechanism of the foldable tricycle, in its folded position, according to an embodiment of the invention.

FIG. 7 is an isometric view diagram depicting the latching mechanism of the foldable tricycle, in its folded position, as depicted in FIG. 6, according to an embodiment of the invention. As described in relations to FIG. 5, the leash 180 is depicted, in this diagram, when it is pulled out and the bolt 182 is pulled out, from its locking position, and the rear support 170 is free to rotate, in relations to the frame 140.

Figure 8:
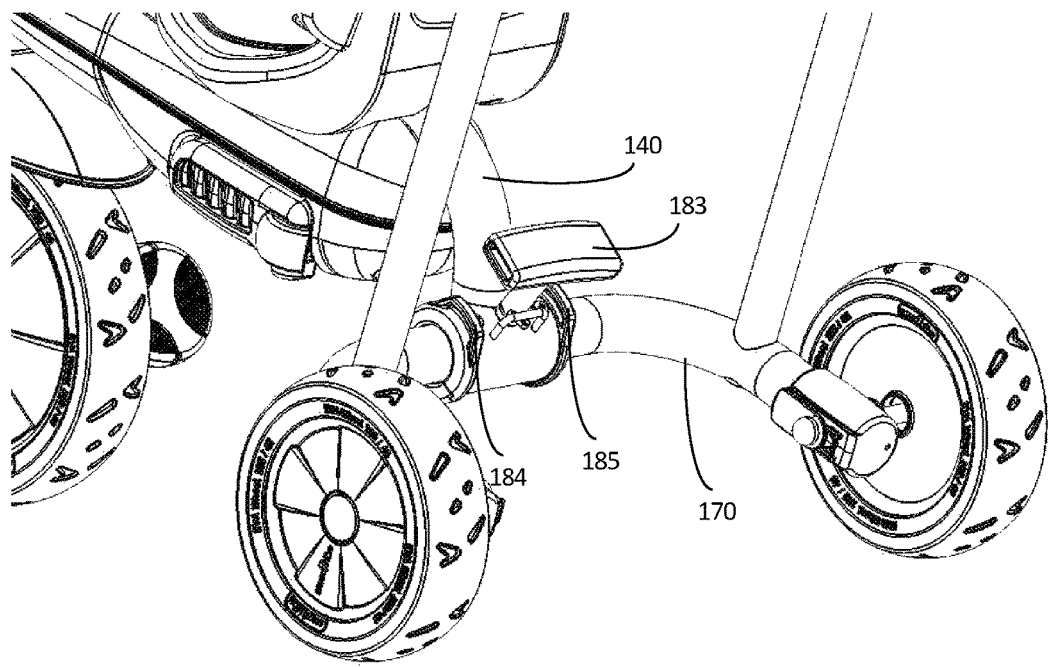
FIG. 8 is an isometric view diagram depicting the rear of the foldable tricycle, in its open position, with another latching mechanism, according to another embodiment of the invention.

FIG. 8 is an isometric view diagram depicting the rear of the foldable tricycle, in its open position, similar to the tricycle depicted in FIG. 3, with a different latching mechanism, according to an embodiment of the invention. In the diagram, instead of a leash the latching mechanism uses a pulling knob 183. The knob 183 may be pulled for folding the tricycle 100. In one embodiment, the knob 183 may be tied by restrainers, such as ropes or straps etc., to the rear support 170. For example, the knob 183 may be tied by straps to the slipknots 184-185 which are attached to the rear support 170. In one embodiment, the user can pull the knob 183 and thus fold the tricycle 100 in one motion. For example, when the knob 183 is pulled upwards and held by straps to the slipknots 184-185, the frame 140 and the rear support 170 may each rotate downwards, due to gravity, effectively causing the tricycle to fold.

Figure 9:
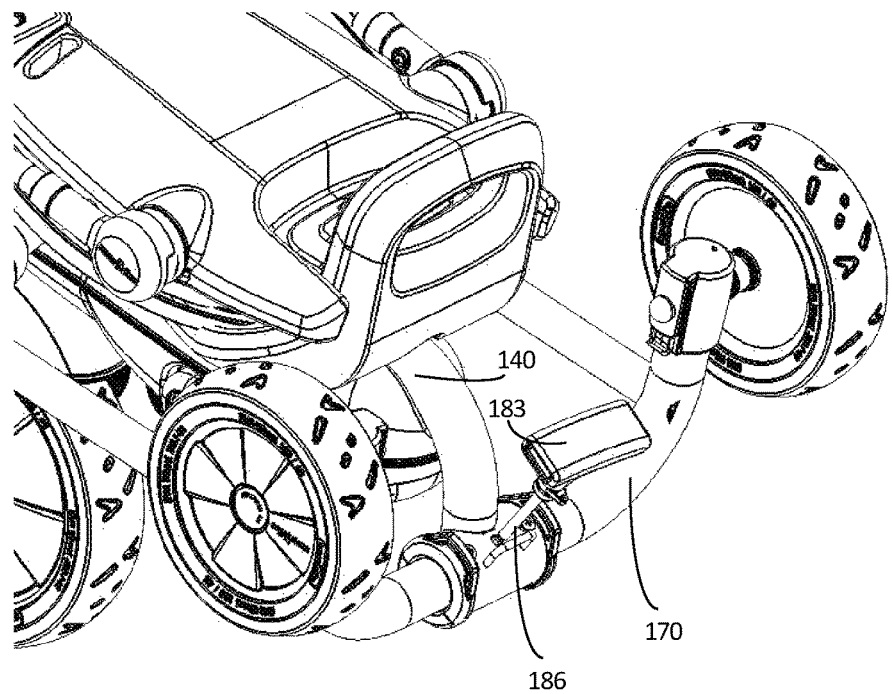
FIG. 9 is an isometric view diagram depicting the rear of the tricycle, in its folded position, according to another embodiment of the invention.

FIG. 9 is an isometric view diagram depicting the rear of the tricycle, in its folded position, depicted the latching mechanism, described in relations to FIG. 8, according to an embodiment of the invention. As depicted, the knob 183 has been pulled out for folding the tricycle. When the knob 183 is pulled out—its connected pin 186 is pulled from its locking position, within the rear support 170, and the rear support 170 is free to rotate in relations to the frame 140. In order to open the tricycle again, the rear support 170 may be rotated back to its open position where the knob 183 and its pin 186 may be inserted back into its locking position, i.e. into the corresponding holes within the rear support 170 and frame 140. In one embodiment, the knob 183 or its pin 186 may have a locking mechanism for ensuring that the knob 183 and its pin 186 cannot slip out unintentionally. For example, the pin 186 may have a grooved hollow cylinder head, e.g. like a screw head, where at least one of the holes in the rear support 170, and/or in the frame 140, may have the corresponding grooved hollow cylinder, e.g. like a screw nut, where the pin 186 may be inserted and twisted for safe locking the pin 186 inside. In one embodiment, the rear support 170 may have 2 holes, one for interlocking the pin 186 while the tricycle is in the open position and one for interlocking the pin 186 while the tricycle is in the folded position. Thus, the pin 186 may interlock the rear support 170 to the frame 140 in any one of the 2 positions—open or folded.

In other embodiments, other latching mechanisms may be used. For example, a simple bolt may be inserted manually through hole(s) in the frame 140 and hole(s) in the rear support when the tricycle is in its unfolded position, and the same bolt may be manually pulled out when folding the tricycle.

Figure 10:
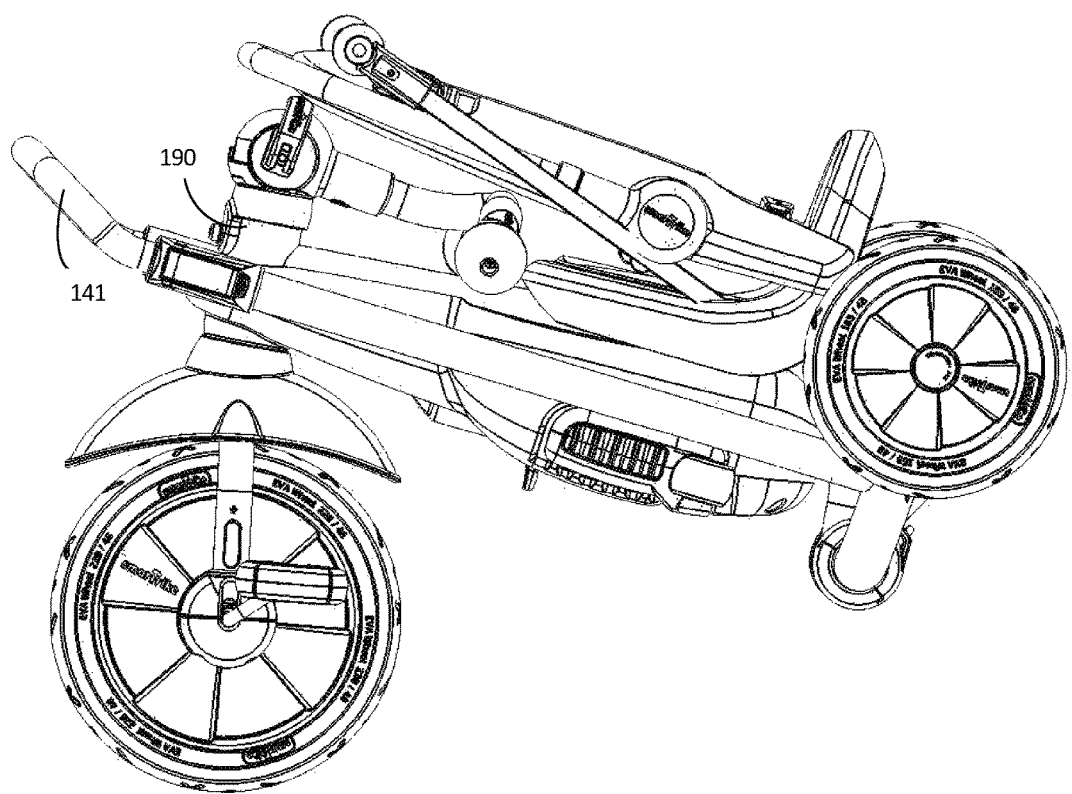
FIG. 10 is a side view diagram depicting a foldable tricycle, in another folded position, according to another embodiment of the invention.

FIG. 10 is a side view diagram depicting a foldable tricycle, in another folded position, according to another embodiment of the invention. In this embodiment, the tricycle's parental handle 141 is folded even further, than depicted in FIG. 2, and closer to the head tube 190. This figure also illustrates the embodiment where the parental handle 141 is capable of rotating under the tricycle 100 so at least a portion of the head tube 190 passes through the space 335 while the attached rear support is folded in relation to said frame 140. In one embodiment the parental handle 141 is capable of rotating under the tricycle 100 so at least a portion of the main frame 140 passes through the space 335. When the latching mechanism is unlocked, it permits the parental handle 141 to be capable of rotating under the tricycle so the head tube 190 passes through the front wheel space 335 to reconfigure the tricycle into a trolley configuration as better illustrated at FIG. 11.

Figure 11:
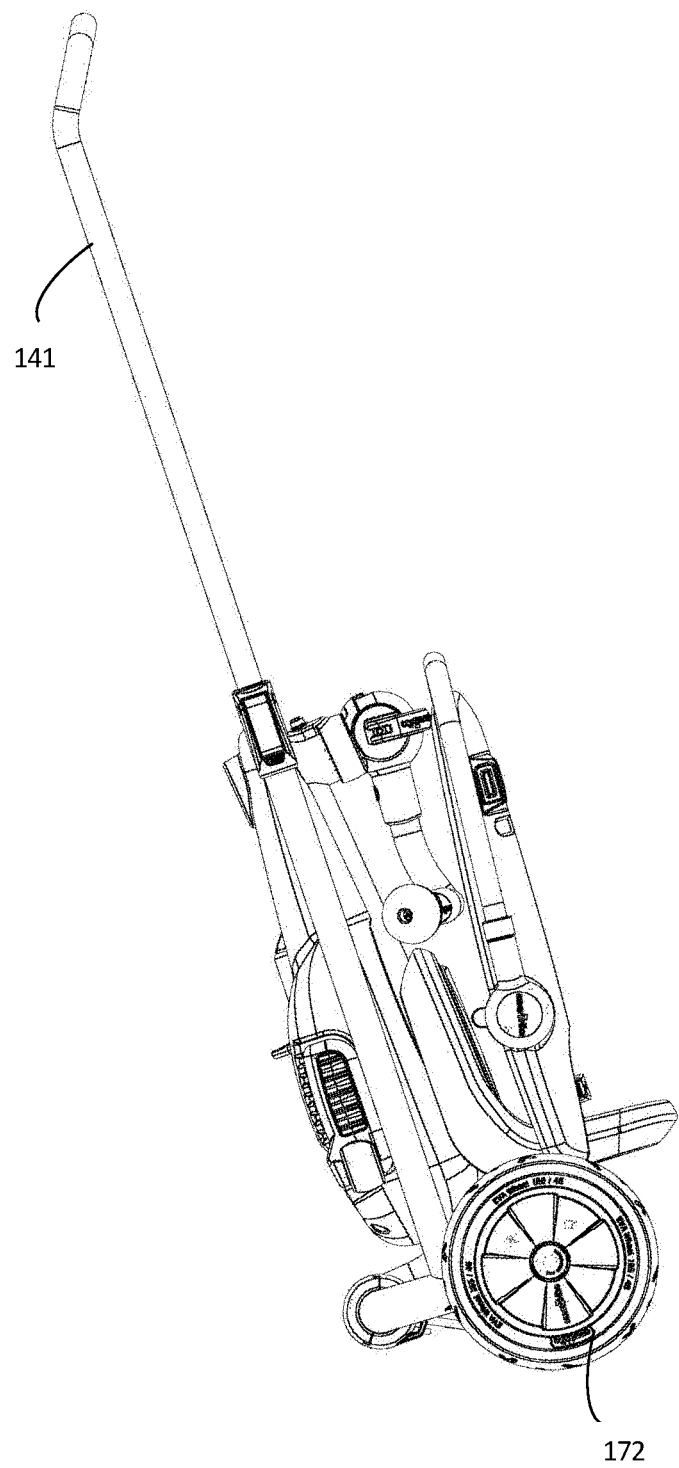
FIG. 11 is a side view diagram depicting the foldable tricycle in a trolley like folded position, according to another embodiment of the invention.

FIG. 11 is a side view diagram depicting the foldable tricycle in a trolley like folded position, according to another embodiment of the invention. In this diagram, the tricycle is depicted with the parental handle 141 folded, as described in relations to FIG. 10, albeit, with the parental handle 141 extended. In this trolley like folded position, the folded tricycle can be rolled on its rear wheels while holding the parental handle 141. This trolley folded position may be handy when the attendant wishes to move and roll the tricycle conveniently while the tricycle is folded. In one embodiment, the folded tricycle may be wrapped up in a protective bag, where the protective bag may have holes for the rear wheels 172 and may have a hole for the parental handle 141. In one embodiment, the front wheel assembly may be removed for easier handling. In one embodiment, the front wheel assembly may be removed and attached at the back of the seat. In another embodiment, the front wheel assembly may be folded for easier handling. In yet another embodiment the front wheel assembly may be left in place and the tricycle may be folded with its front wheel sticking out, as described and depicted in relations to FIG. 10.

Figure 12A:
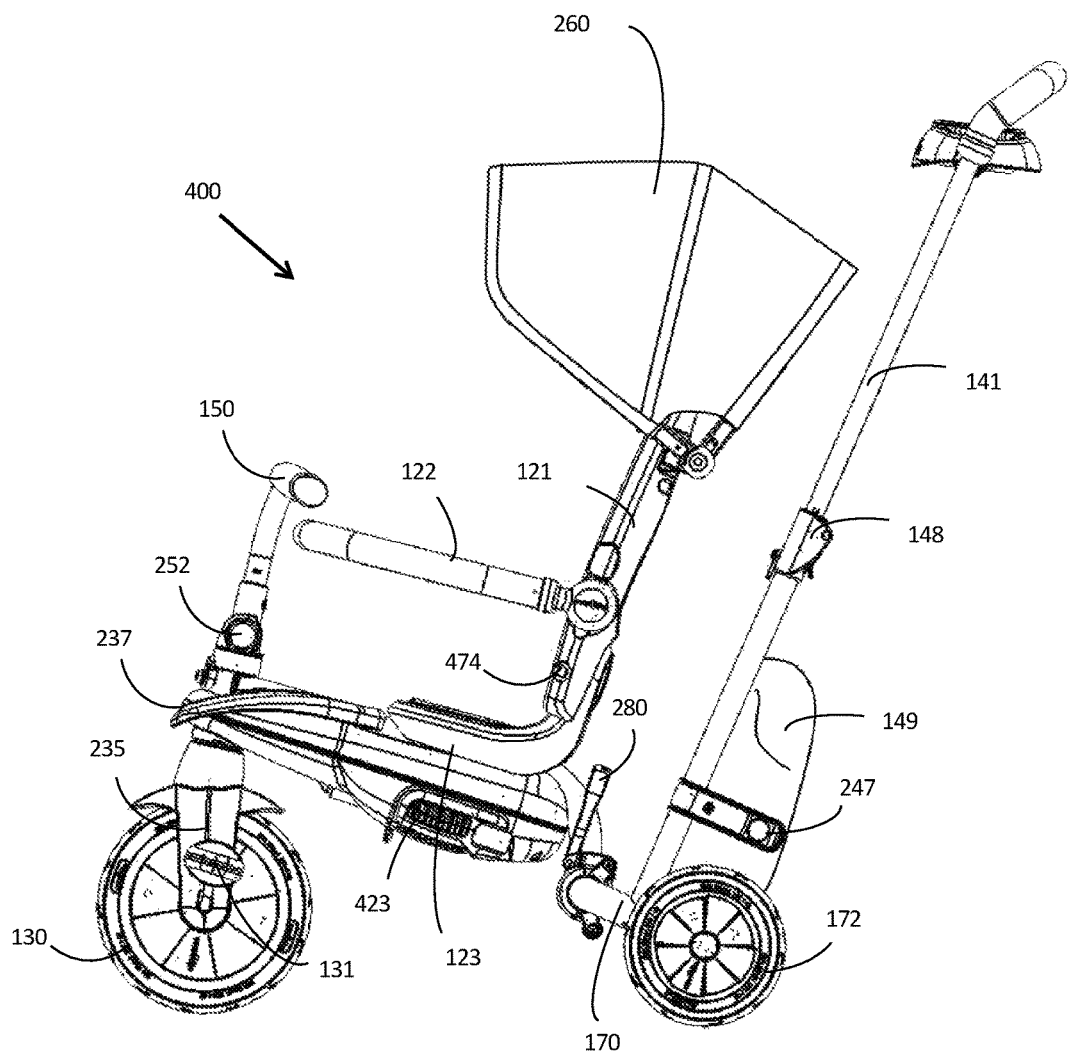
FIG. 12a is a right-view diagram depicting a foldable tricycle, in its open position, according to another embodiment of the invention.

FIG. 12*a* is a right view diagram depicting a foldable tricycle, in its open position, according to another embodiment of the invention. In this embodiment, similar to the described in relations to FIG. 1, the tricycle may be propelled by a pedaling rider, in a first mode, or may be propelled by an attendant, who pushes the tricycle, in a second mode. The foldable seat may comprise a sitting chair 123 and a foldable back support 121 for supporting the back of the rider. In one embodiment, a foldable arm rest 122 may be connected to the foldable back support 121. In one embodiment, the foldable arm rest 122 may be connected to the back support 121 by a screw, rivet, pin, or any other connecting means which may allow the rotation and folding of the arm rest 122. In one embodiment, the foldable arm rest 122 may rotate upwards, when folding and rotate downwards, when unfolding, until the foldable arm rest 122 rests in an angle where the arm rest 122 is about parallel to chair 123. In one embodiment, the foldable arm rest 122 may be detachably connected to the back support 121, thus allowing the user to detach the arm rest 122 from the back support 121.

The tricycle 400, as depicted in FIG. 12*a*, may have 2 rear wheels, such as rear wheel 172 which may by rotatably supported by a rear support 170. In one embodiment, tricycle 400 may have at least one front wheel 130 with a front wheel axis and a pair of pedals, where each of the pedals may be configured for connection about the front wheel axis to rotate the front wheel 130. The front wheel 130 may be pedaled by the left pedal 131 and a right pedal (not shown) by the rider in the first mode. In one embodiment, the pedals may be foldable pedals. In another embodiment, the pedals may be detachable pedals.

In one embodiment, the tricycle 400 may have a foldable canopy 260 which can be opened, as depicted in FIG. 12*a*, for protecting the rider from the sun or rain. In some embodiments the hinges of the canopy, may be used for closing and opening the canopy 260 and for folding the canopy 260 when the tricycle 400 is in the folded position. In some embodiments the hinges of the canopy 260 may be detachable and may be used for detaching or attaching the canopy 260 from/to the back support 121.

Embodiments of the invention may also include a rider handle 150 and a fork 235, for rotatably supporting the front wheel 130, and a fork's stem (not shown). The fork may be made of metal, plastic, resin, or any other rigid material. In one embodiment, the front wheel 130 and its fork 235 may be detachable from the main body of the tricycle 400. In one embodiment, the front wheel 130 and its fork 235 may be detachable from the main body of the tricycle 400 by pushing a button of a snap-in-place part. In another embodiment, the front wheel 130 and/or its fork 235 may be foldable in relations to the main body of the tricycle 400. In one embodiment, the rider handle 150 may be foldable, where the base mechanism 252 may be rotatable and may fold the rider handle 150 when the tricycle is in the folded position. In one embodiment, the base mechanism 252 may have a snap in place button where a push on the button may allow the folding of the handle 150. In another embodiment, the base mechanism 252 may have a fastener where the fastener may be opened for folding the handle 150. Other known mechanisms may be used as well for folding the handle 150.

In one embodiment, the tricycle may have a legs rest such as leg rest 237 for younger children, such as children between 9-12 months. In one embodiment, a younger child may rest his legs on the leg rest 237 when the tricycle is steered and propelled by an attendant, who pushes the tricycle from behind, in a second mode.

In one embodiment, the tricycle may have a foldable foot such as foot rest 423 for older children, such as children above 12 months. In one embodiment, the foldable foot rest 423 may be opened for allowing an older child to rest his feet on the foot rest 423 when the tricycle is steered and propelled by an attendant, who pushes the tricycle from behind, in a second mode.

In some embodiments, the tricycle may have a fastener, such as fastener 247, and a pin 474 for holding the tricycle in the folded position, once the tricycle is folded. In one embodiment, the fastener 247 has to be disengaged from the pin 474 prior to opening and unfolding the tricycle.

Figure 12B:
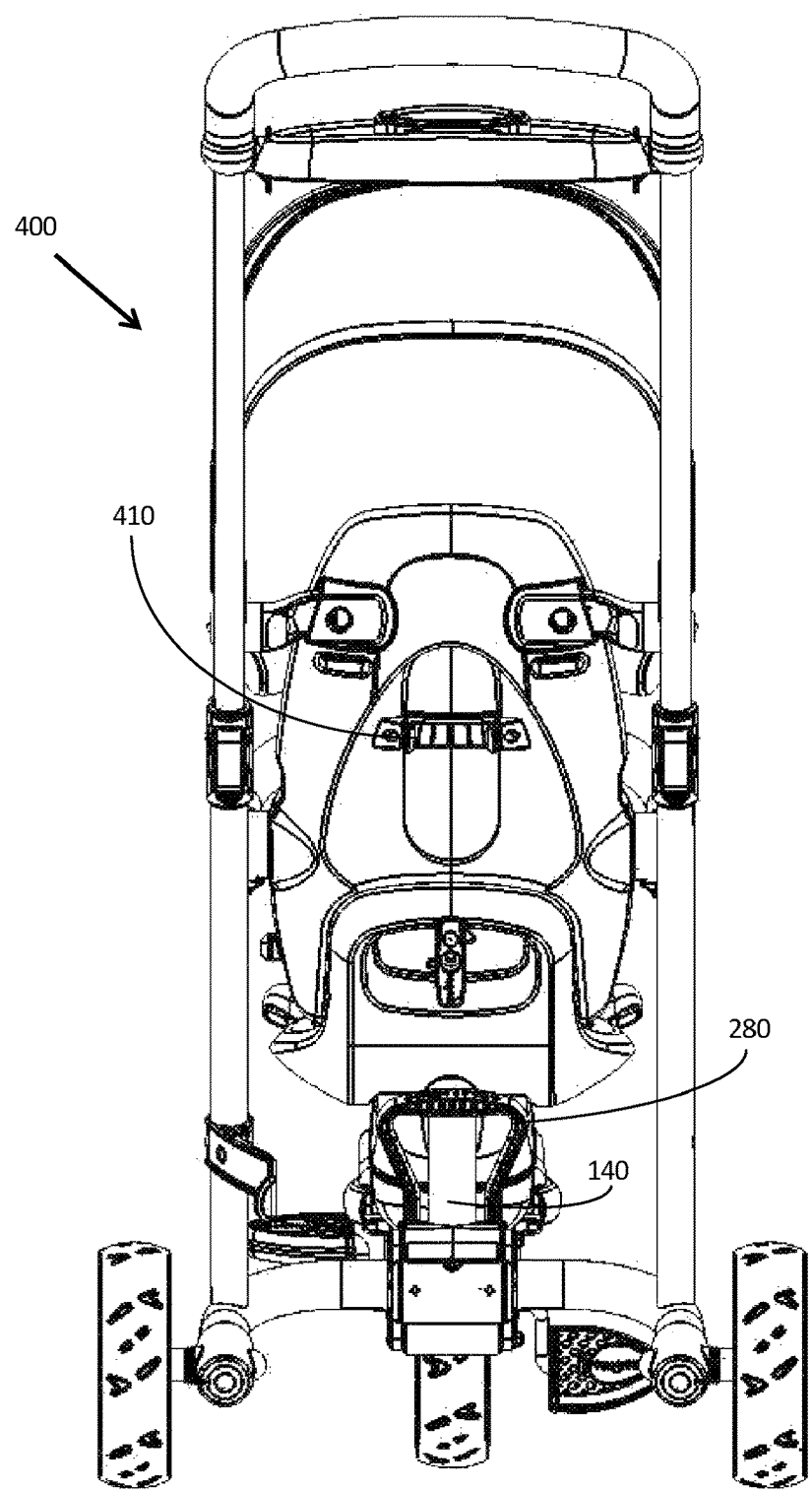
FIG. 12b is a back-view diagram depicting a foldable tricycle, according to another embodiment of the invention.

FIG. 12*b* is a back-view diagram depicting the foldable tricycle, described in relations to FIG. 12*a*, according to another embodiment of the invention. In one embodiment, the tricycle 400 may have a holder, such as holder 410, at the back of back support 121 for holding the front wheel 130 when the tricycle 400 is folded.

Figure 13A:
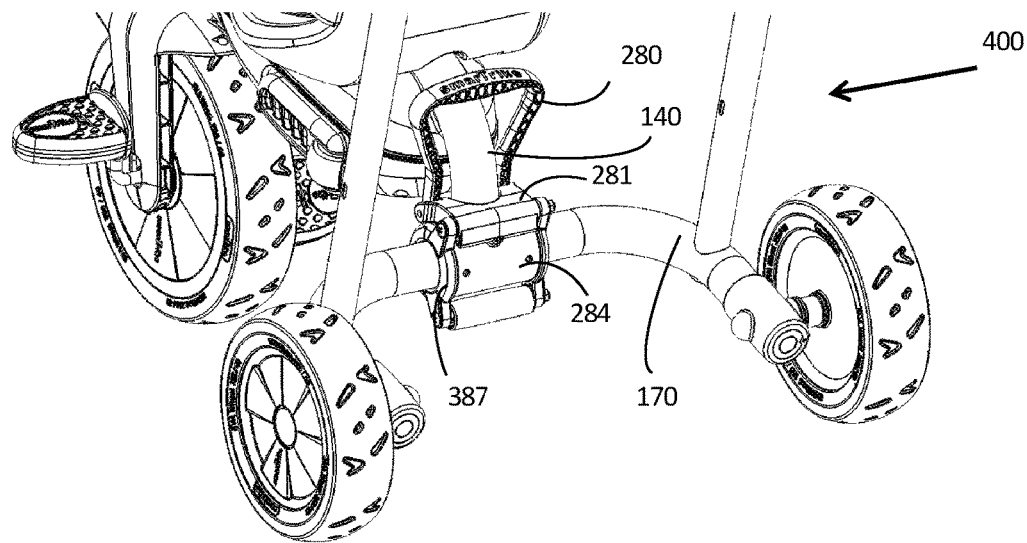
FIG. 13a is an isometric view diagram depicting the rear of the foldable tricycle, in its open position, according to an embodiment of the invention.

FIG. 13*a* is an isometric view diagram depicting the rear of the foldable tricycle, in its open position, similar to the tricycle depicted in FIGS. 12*a*-*b*, according to an embodiment of the invention. In this embodiment, a folding grip 280 may be pulled upwards for folding the tricycle 400, and will be described in greater detail in relations to FIG. 13*b*. In this embodiment, the grip 280 may be connected by screws, pins or any other pivots to a ledge 281 which may be connected by screws, pins or any other pivots to the holders 387 of the cylindrical cover 284 which may be wielded or attached in any way to the frame 140. Thus, the user can pull the grip 280 and fold the tricycle 400 in one motion. For example, when the grip 280 is pulled upwards the frame 140 and the rear support 170 may each rotate downwards, due to gravity, effectively causing the tricycle 400 to fold.

Figure 13B:
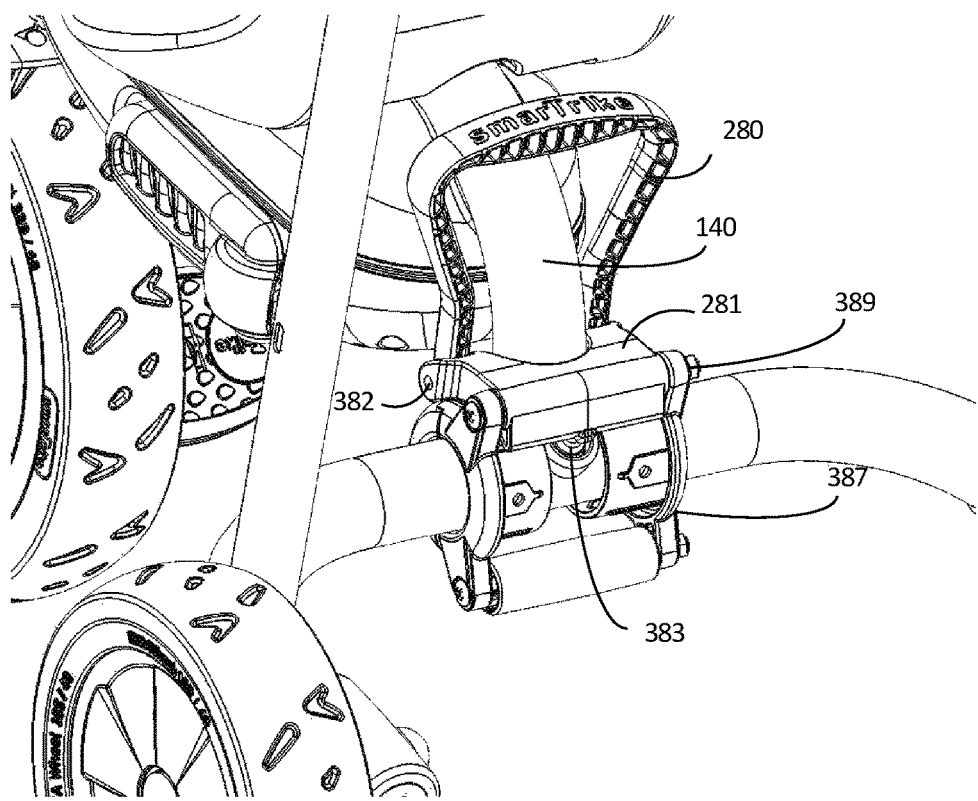
FIG. 13b is an isometric view diagram depicting the rear of the tricycle, without the cylindrical cover, according to an embodiment of the invention.

FIG. 13*b* is an isometric view diagram depicting the rear of the tricycle, described in relations to FIG. 13*a*, without the cylindrical cover, according to an embodiment of the invention. In this embodiment, the grip 280 may be connected by screws, such as screw 382, to the ledge 281, where the ledge 281 may be connected by screws, such as screw 389, to the holders 387 (of the cylindrical cover) which may be wielded or attached in any know way to the frame 140, for allowing the rotation of the ledge 281 in relations to the frame 140. The ledge 281 may have a protrusion, for acting as a hammer, for pushing the bolt 383 inwards. The bolt 383, which may be held outwards by a spring or the like, may hold the tricycle 400 in the unfolded position by being specifically positioned in the hole of the cylindrical cover while being held in the rear support 170, thus holding the frame 140 in relations to the rear support 170. When the grip 280 is pulled upwards, the ledge 281 may push and knock the bolt 383 inwards, effectively allowing the frame 140 to rotate in relations to the rear support 170. Thus, when the bolt 383 is pushed inwards while the grip 280 is pulled upwards, the frame 140 and the rear support 170 may each rotate downwards, due to gravity and due to the fact that the bolt 383 does not hold the frame 140 in relations to the rear support 170 anymore, which causes the tricycle 400 to fold downwards. However, for opening and locking the tricycle 400 in the open position, the tricycle 400 should be opened and the grip 280 should be released in order for the bolt 383 to move outward towards its initial position, by insertion into predefined holes in the frame 140 while being held in the rear support 170, for locking the frame 140 together with the rear support 170. In one embodiment, the rear support 170 may have 2 holes, one hole for interlocking the bolt while the tricycle 400 is in the open position and one hole for interlocking the bolt while the tricycle 400 is in the folded position. Thus, the bolt 383 may interlock the rear support 170 in relations to the frame 140 in any one of the 2 positions—open or folded.

Figure 14:
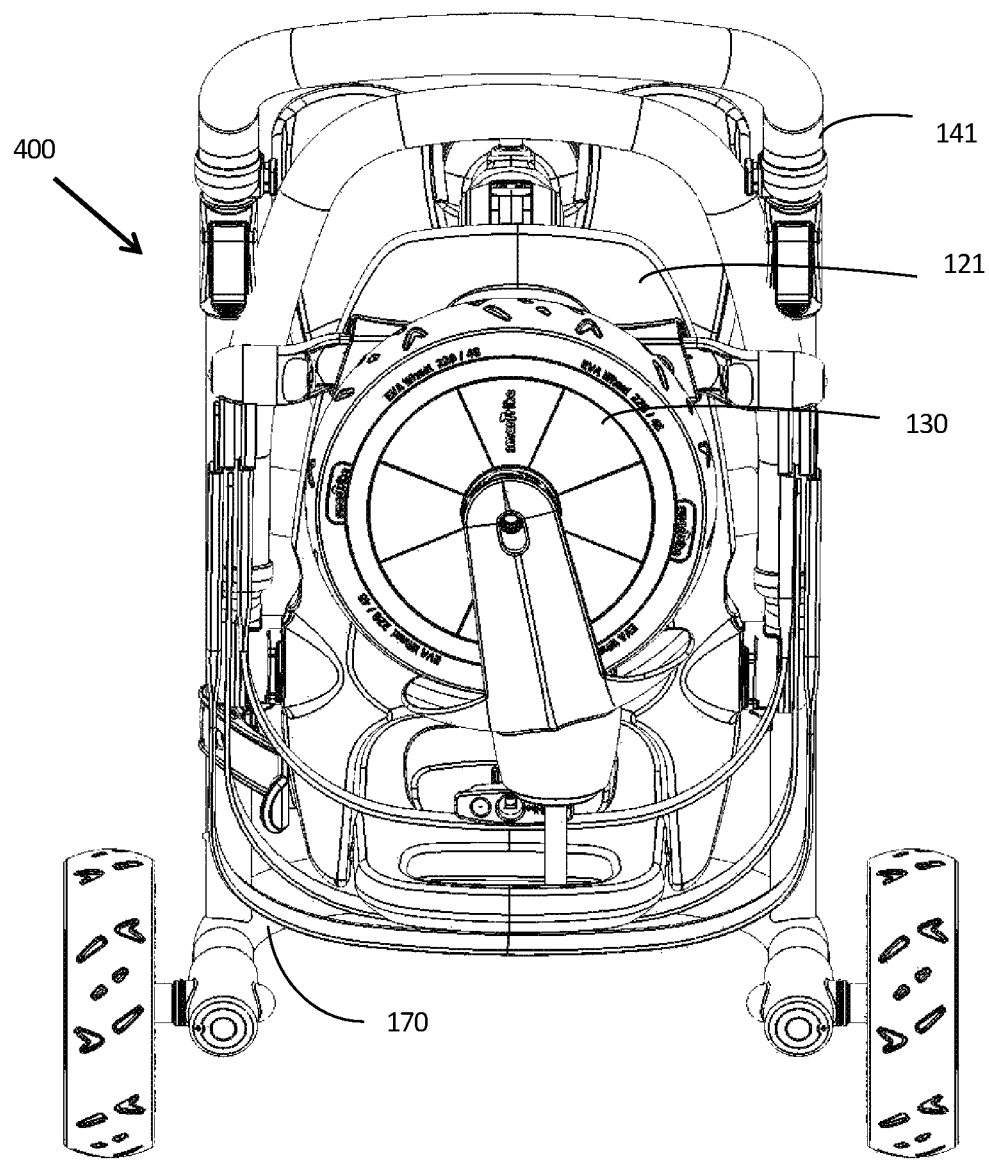
FIG. 14 is a back-view diagram depicting the tricycle in a folded position, according to an embodiment.

FIG. 14 is a back-view diagram depicting the tricycle 400 in a folded position, according to an embodiment. In this folded position, the parental handle 141 may be rotated under the tricycle 400 toward the front of the tricycle, effectively rotating the attached rear support 170 in relations to the frame. In this embodiment, the front wheel 130 may be detached from the tricycle 400, when folded, and attached to the back of the back support 121. In another embodiment, the front wheel 130 may be detached from the tricycle 400, when folded, and inserted in a pocket (not shown), made of cloth or any other material, attached to the back of the back support 121. In one embodiment, the tricycle 400 may be folded together with its arm rest. In one embodiment, the tricycle 400 may be folded together with its canopy. In one embodiment, the tricycle 400 may be folded together with its rear bag. In yet another embodiment the tricycle 400 may be folded together with the parental handle 141. In yet another embodiment the tricycle 400 may be folded together with the parental handle 141 and the arm rest. In yet another embodiment the tricycle 400 may be folded together with all its depicted parts, including its arm rest, its canopy, and its rear bag. In one embodiment, in the folded position, the overall dimensions (width*height*length) of the folded tricycle may be less than 20% of the overall dimensions of the open tricycle. In one embodiment, the dimensions of the open tricycle are less than 99×44×101 cm. In one embodiment, the dimensions of the trolley like folded tricycle are less than 44×35×99 cm. In one embodiment, the dimensions of the folded tricycle are less than 44×35×61 cm. In one embodiment, the dimensions of the folded tricycle, with its rear wheels detached, are less than 33×33×61 cm. In one embodiment, the dimensions of the open tricycle are less than 98×49×101 cm. In one embodiment, the dimensions of the trolley like folded tricycle are less than 49×35×104 cm. In one embodiment, the dimensions of the folded tricycle are less than 49×35×64 cm. In one embodiment, the dimensions of the folded tricycle, with its rear wheels detached, are less than 37×34×62 cm.

Figure 15A:
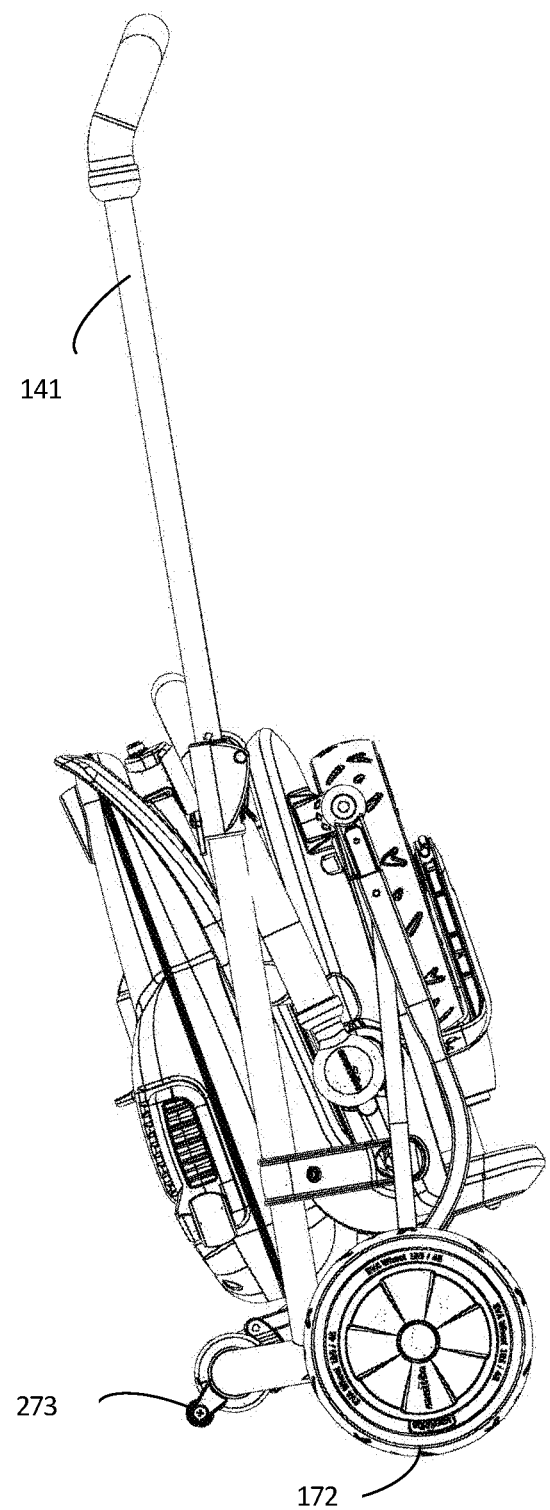
FIG. 15a is a side view diagram depicting the foldable tricycle in a trolley like folded position, according to another embodiment of the invention.

FIG. 15a is a side view diagram depicting the foldable tricycle 400 in a trolley like folded position, according to another embodiment of the invention. In this diagram, the tricycle is depicted in its folded position, as described in relations to FIG. 14, albeit, with the parental handle 141 extended. In this trolley like folded position, the folded tricycle can be rolled on its rear wheels while holding the parental handle 141. This trolley folded position may be handy when the attendant wishes to move and roll the tricycle conveniently while it the tricycle is folded. In one embodiment, the tricycle may have an auxiliary wheel, such as auxiliary wheel 273, for providing easier rolling of the folded tricycle. For example, when the attendant wishes to move and roll the tricycle conveniently while the tricycle is in the trolley like folded position, the tricycle may be rolled on its rear wheels 172 and its auxiliary wheel 273. In one embodiment, the tricycle may have more than one auxiliary wheel. In one embodiment, the folded tricycle may be wrapped up in a protective bag, where the protective bag may have holes for the rear wheels 172, a hole for the auxiliary wheel 273 and may have a hole for the parental handle 141. In one embodiment, the front wheel assembly may be removed and held at the back of the back support of the seat.

Figure 15B:
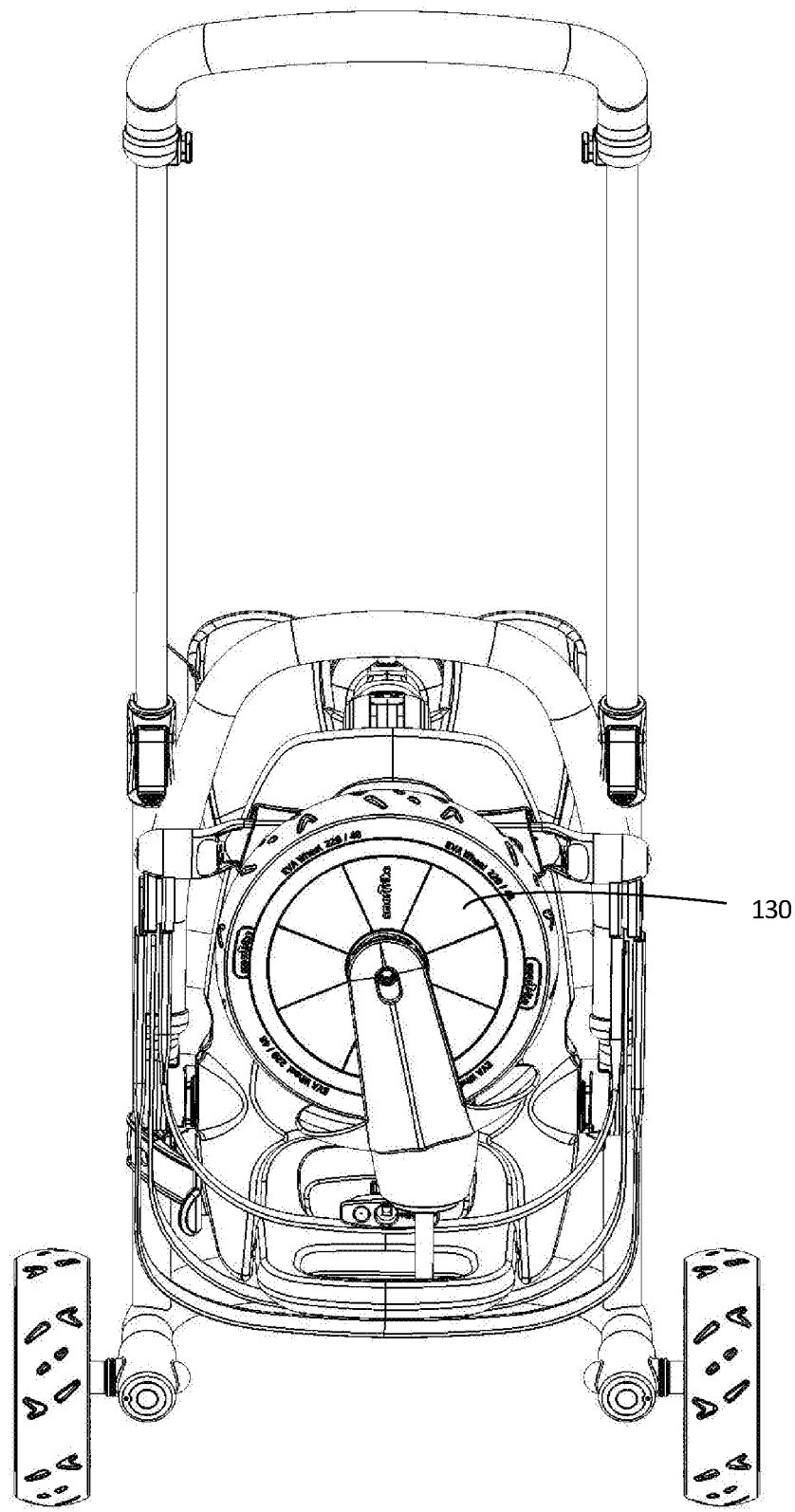
FIG. 15b is a back-view diagram depicting the foldable tricycle in a trolley like folded position, according to an embodiment of the invention.

FIG. 15b is a back-view diagram depicting the foldable tricycle 400, in a trolley like folded position, according to an embodiment of the invention.

Figure 16A:
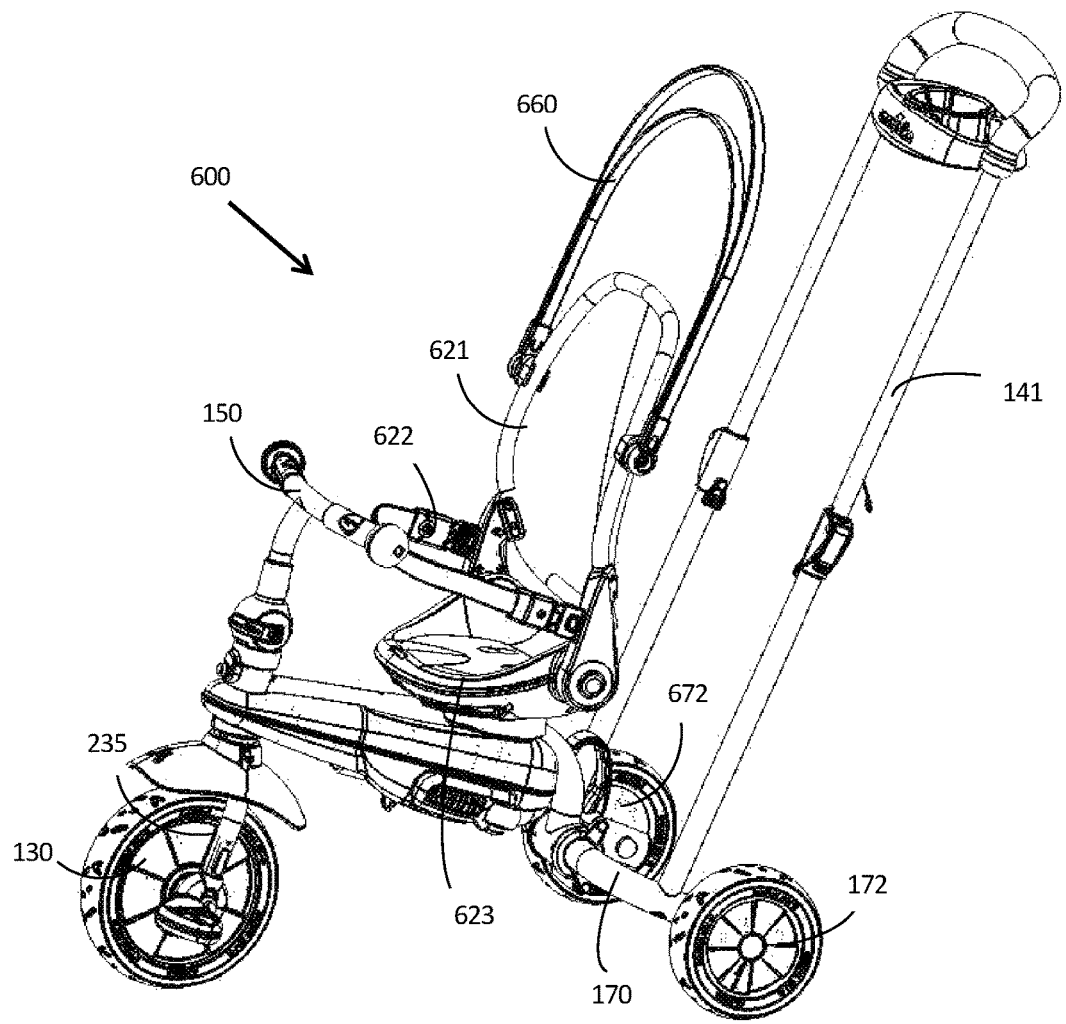
FIG. 16a is a right view diagram depicting a foldable tricycle, in its open position, according to another embodiment of the invention.

FIG. 16a is a right view diagram depicting a foldable tricycle, in its open position, according to another embodiment of the invention. In this embodiment, similar to the described in relations to FIG. 1, the tricycle 600 may be propelled by a pedaling rider, in a first mode, or may be propelled by an attendant, who pushes the tricycle, in a second mode. The foldable seat may comprise a sitting chair 623 and a foldable back support 621 for supporting the back of the rider. In one embodiment, a foldable arm rest 622 may be connected to the foldable back support 621. In one embodiment, the foldable arm rest 622 may be connected to the back support 621 by a screw, rivet, pin, or any other connecting means which may allow the rotation and folding of the arm rest 622. In one embodiment, the foldable arm rest 622 may rotate upwards, when folding and rotate downwards, when unfolding, until the foldable arm rest 622 rests in an angle where the arm rest 622 is about parallel to chair 623. In one embodiment, the foldable arm rest 622 may be detachably connected to the back support 621, thus allowing the user to detach the arm rest 622 from the back support 621.

The tricycle 600, as depicted in FIG. 16a, may have 2 rear wheels, such as rear wheel 172 and rear wheel 672 which both may by rotatably supported by a rear support 170. Tricycle 600 may have at least one front wheel 130. In one embodiment, the tricycle 600 may have a foldable canopy 660, for protecting the rider from the sun or rain. In some embodiments the hinges of the canopy, may be attached to the back support 621 and used for closing and opening the canopy 660 and for folding the canopy 660 when the tricycle 600 is in the folded position, or for detaching and attaching the canopy to the back support 621.

Embodiments of the invention may also include a rider handle 150 and a fork 235, for rotatably supporting the front wheel 130, and a fork's stem (not shown). The fork may be made of metal plastic, resin, or any other rigid material. In one embodiment, the front wheel 130 and its fork 235 and the fork's stem may be detachable from the main body of the tricycle 600. In another embodiment, the front wheel 130 and/or its fork 235 may be foldable in relations to the main body of the tricycle 600. In one embodiment, the rider handle 150 may be foldable.

Figure 16B:
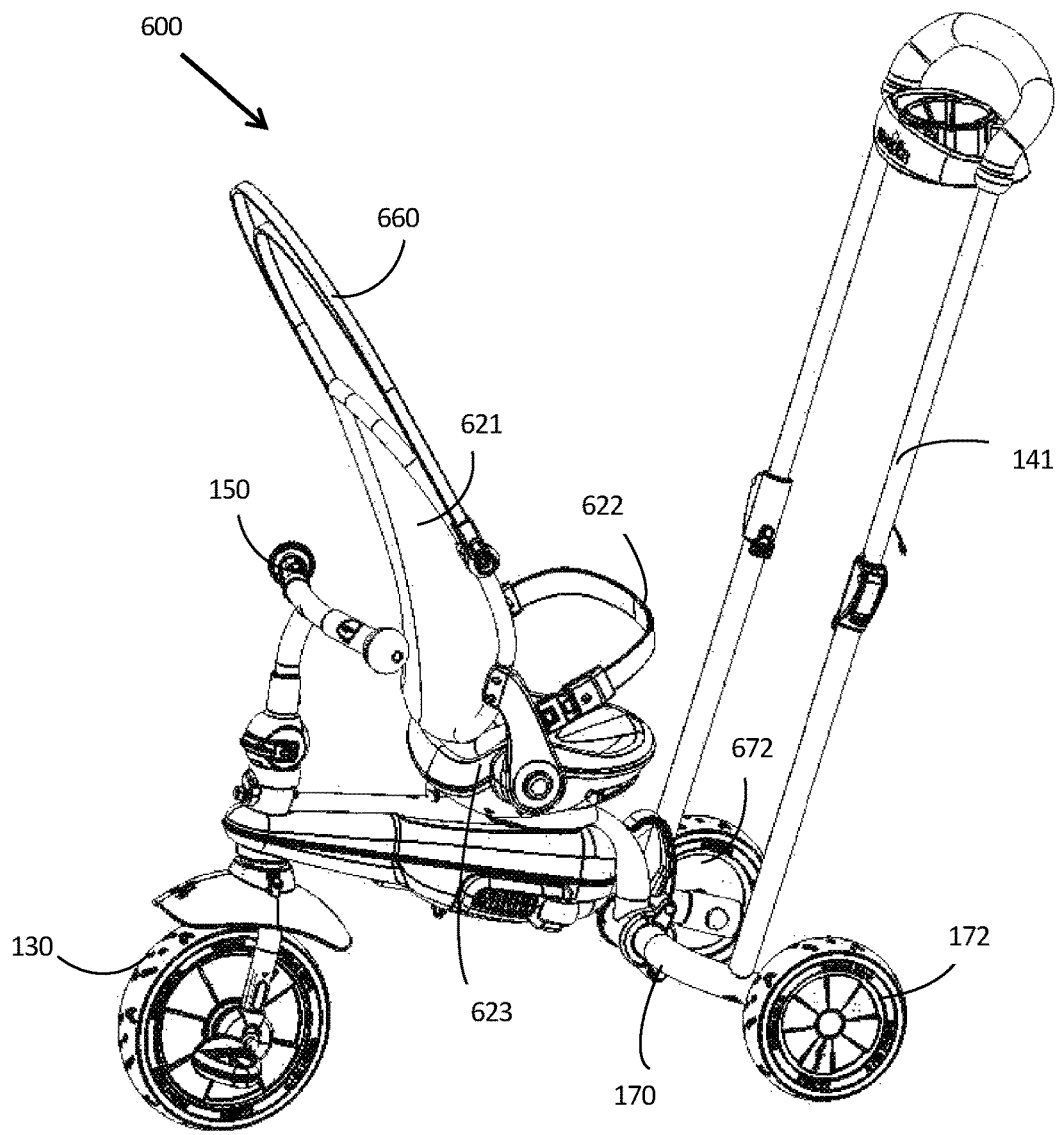
FIG. 16b is a right view diagram depicting a foldable tricycle, similar to the described in relations to FIG. 16a, where the seat has been turned around, according to an embodiment of the invention.

FIG. 16b is a right view diagram depicting a foldable tricycle, similar to the described in relations to FIG. 16a, where the seat has been turned around, according to an embodiment of the invention. In this embodiment, the seat 623 has been turned around, in about 180°, in order to allow the attendant to see the rider. As described in relations to FIG. 16a the tricycle 600 may be propelled by a pedaling rider, in a first mode, or may be propelled by an attendant, who pushes the tricycle, in a second mode. The foldable turnable seat may comprise a turnable sitting chair 623 and a foldable back support 621 for supporting the back of the rider. In one embodiment, the foldable seat may be a reclining seat where the back support 621 may be reclined as to allow a wider angle between the chair 623 and the back support 621. In one embodiment, a foldable arm rest 622 may be connected to the foldable back support 621. In one embodiment, the foldable arm rest 622 may be connected to the back support 621 by a screw, rivet, pin, sliding tongue or any other connecting means which may allow the rotation and folding or disengagement of the arm rest 622 from the back support 621. In one embodiment, the foldable arm rest 622 may rotate upwards, when folding, and rotate downwards, when unfolding until the foldable arm rest 622 rests in an angle where the arm rest 622 is about parallel to chair 623. In one embodiment, the foldable arm rest 622 may be detachably connected to the back support 621, thus allowing the user to detach the arm rest 622 from the back support 621.

Other embodiments are possible as well for folding and unfolding the tricycle.

The described folding mechanisms may be used for folding and unfolding other vehicles as well.

In some embodiments, the seat may have shoulder straps for strapping the rider in the seat and protecting him from falling. In one embodiment, the shoulder straps may also be used for locking and securing the folding of the tricycle. For example, the shoulder straps may be buckled by a buckle on the sitting chair or may be buckled by a buckle on the back of the tricycle. Thus, in some embodiments, the same shoulder straps may be used for protecting the rider, when the tricycle is opened and in use, and the same shoulder straps may also be used for tying and securing the folded tricycle, in its folded position.

According to an embodiment, the foldable tricycle is operable between a first mode of operation steerable by the tricycle rider, and a second mode of operation steerable by an attendant pushing the tricycle. In one embodiment, the depicted tricycle has a front swivel wheel, i.e. crazy wheel, for easy steerability in the second mode. During the second mode, when an attendant pushes the tricycle from behind, the tricycle may be steered by the attendant from behind by pushing the tricycle left and right and where the front swivel wheel aligns itself left or right accordingly.

For the sake of brevity, a description is set forth, for the configuration of the front swivel wheel. The central axis of the stem of the fork of the front wheel extends in an offset from rotational axis of front wheel by a distance. In one embodiment, the offset distance is in a range of about 15 mm and 40 mm. In another embodiment, the offset distance is in a range of about 10 mm and 50 mm. As the offset distance decreases with all else equal, so to decreases an ability to turn the tricycle from behind using the hand grip. Thus, in one embodiment, the angle between the stem and the fork is between about 165 and 179 degrees. In one embodiment, the minimum diameter of the stem is at least three times less than the width of the front wheel. This combination of geometries is exemplary of a configuration that may permit an attendant to steer, in the second mode, when the stem axis leads the wheel axis, or may permit the tricycle rider to steer, in the first mode.

The rider handle, in a first mode, may be configured to be rotationally coupled with the stem in a manner permitting a tricycle rider to exert forces on the rider handle and thereby turn the fork, and the rider handle in the second mode, may be configured to be rotationally uncoupled from the stem, preventing forces on the rider handle from turning the fork. Rotational coupling and decoupling of the rider handle from the fork may be accomplished in numerous mechanical ways, and the invention, in its broadest sense, is not limited to any particular mechanical interconnection. Rather, any manner in which the rider handle may be coupled and uncoupled to the fork is considered to fall within the scope and spirit of the invention. Moreover, the location of a coupling decoupling mechanism is not necessarily critical to embodiments of the invention. It may be located between a rider handle assembly and a stem, or it may be located between a stem and a fork.

Figure 17:
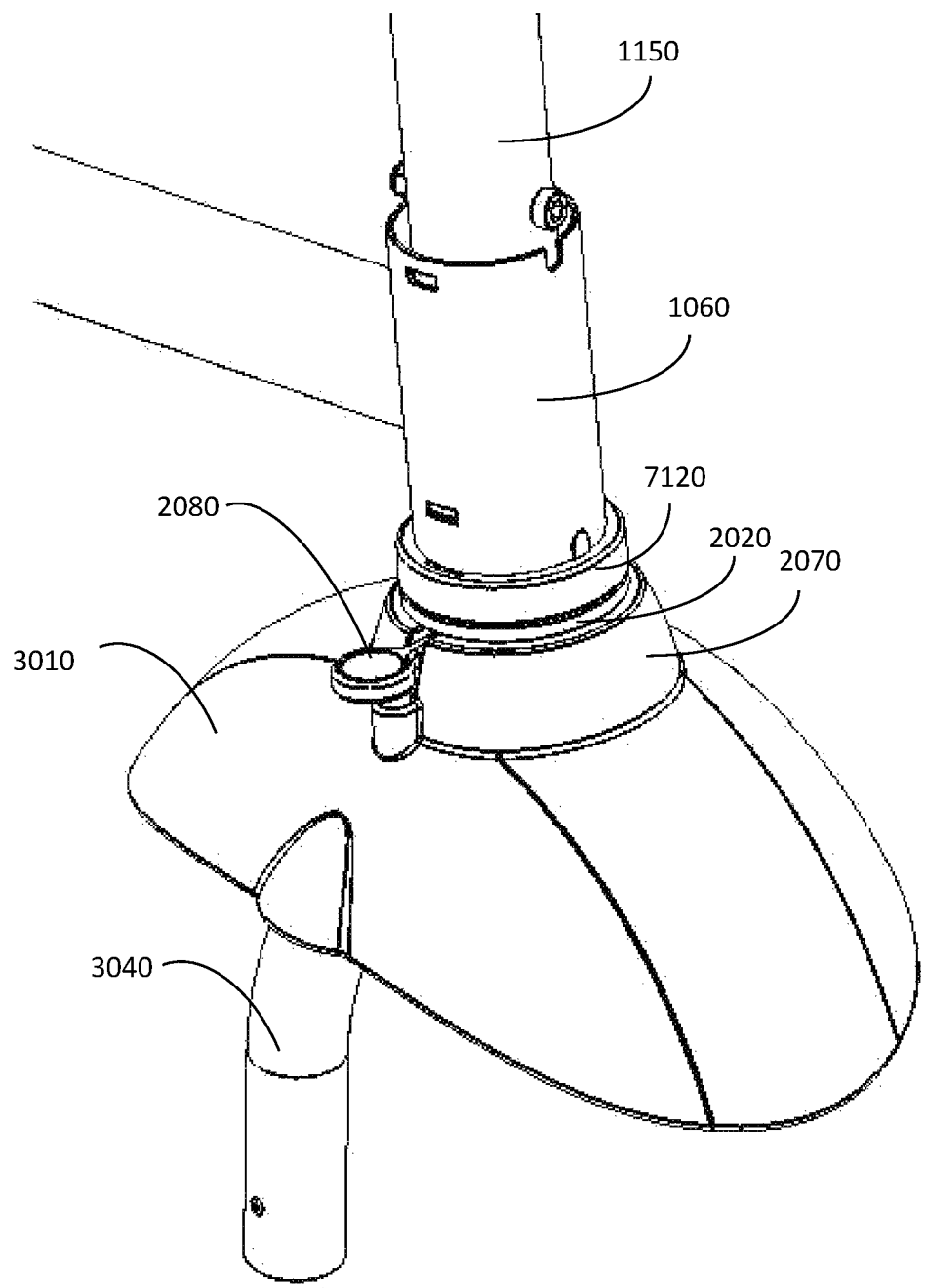
FIG. 17 is a detailed view of a portion of the front wheel assembly, according to one embodiment of the invention.
Figure 18:
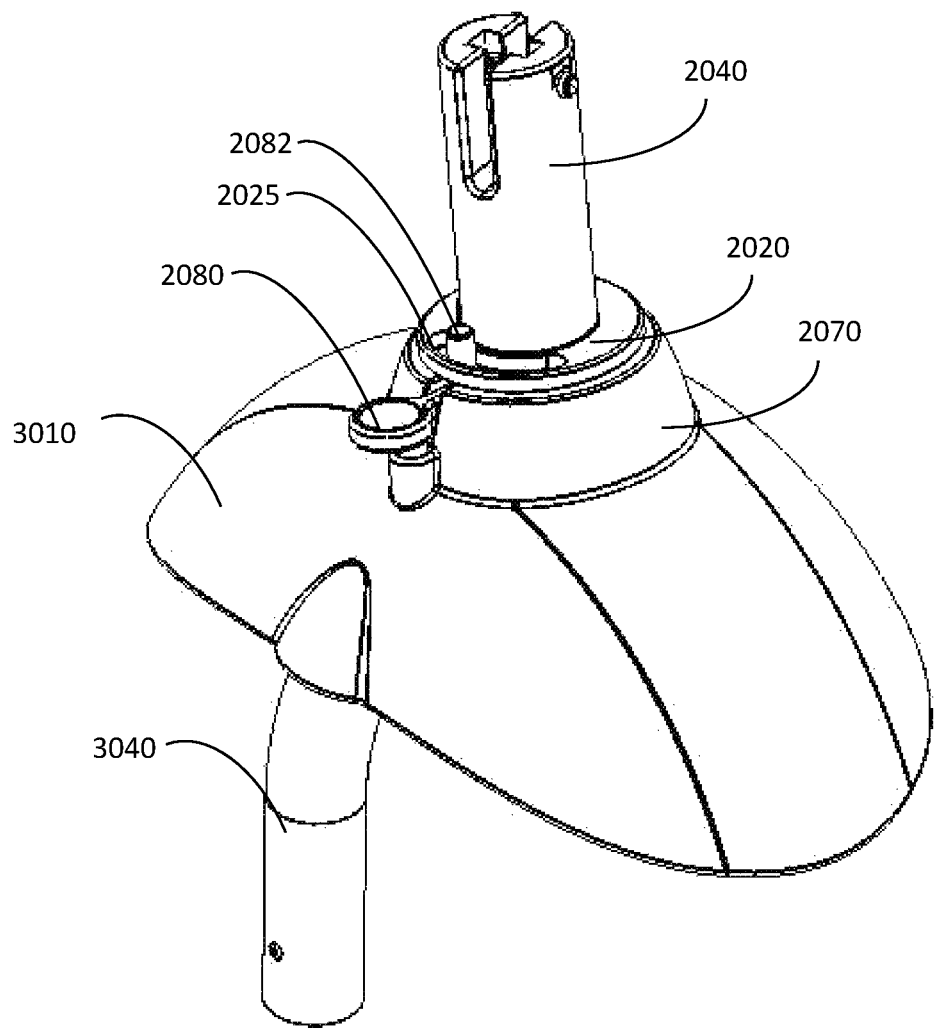
FIG. 18 is a further detailed view of a front wheel assembly, according to an embodiment of the invention.

FIG. 17 is a detailed view of a portion of the front wheel assembly, according to one embodiment of the invention. The wheel assembly may comprise a fork 3040 and a mudguard 3010 with a supporting structure 2070. The supporting structure 2070 and mud-shield 3010 may be made of one piece using the injection method or any other known method. Alternatively, other embodiments may be used. For example, the support structure 2070 may be affixed to the mudguard 3010. The support structure 2070 may include a cone extending from the top of the mudguard 3010. The base 2020 may have a restricting mechanism, which may be formed of a lock hole (not shown) and a lock groove 2025, where the pressure transferring element 2080 may be inserted into either the lock hole or the lock groove. By pressing down the pressure transferring element 2080, the guide 2082, such as shown in FIG. 18, may be released from the recessed member 2020 and the groove 2025, and the wheel assembly may be turned in an angle greater than the limiting angle of recessed member 2025, thereby transferring the tricycle vehicle from the second mode of operation to the first mode of operation. In this embodiment, the pressure transferring element 2080 may be a button which extends from the side of the mudguard, and may be pressed for turning the front wheel from the configuration where the stem axis leads the front wheel axis to a configuration where the stem axis trails the front wheel axis or vise-versa, e.g. when the tricycle is transferred from its first mode of operation to its second mode of operation. Once the front wheel has been turned the pressure transferring element 2080 may be released where it can slide into one of the grooves.

FIG. 18 is a further detailed view of a front wheel assembly, according to an embodiment of the invention. FIG. 18 depicts the front wheel assembly of FIG. 17 with the head tube 1060, the restricting element 7120, and the rail 1150 of the rider handle omitted. As depicted the pressure transferring element 2080 may be held by a spring and may be affixed under the pressure transferring element 2080 for pushing upwards the pressure transferring element 2080, thereby restricting the turning angle of the front wheel. In an embodiment, the pressure transferring element 2080 is not fixed in its place by any connecting technique, such as screws or glue, but is held in place by a spring which presses it towards the top of the supporting structure 2070.

Figure 19:
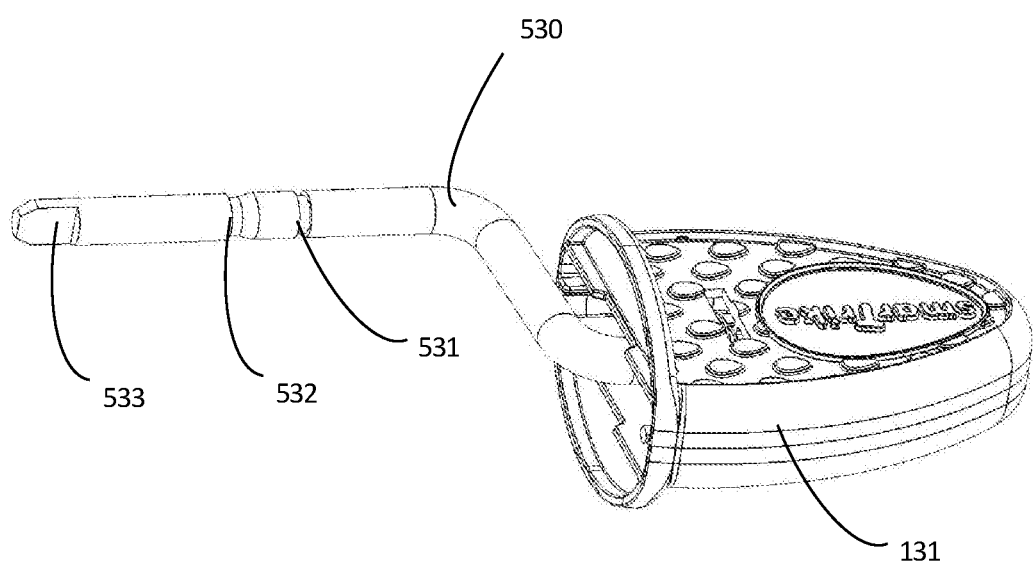
FIG. 19 is a detailed view of the pedal assembly, according to an embodiment of the invention.

FIG. 19 is a detailed view of the pedal assembly, according to an embodiment of the invention. In this embodiment, the pedal 131 is attached to a pedal rod 530. The pedal rod 530 may be configured for connection about the front wheel axis. The pedal rod 530 may end in an uncircular protrusion, such as protrusion 533, as to fit and connect the protrusion 533 to the front wheel in order to allow the rotation of the front wheel by pedaling the pedal 131. In one embodiment, the pedal rod 530 may have 2 cavities such as cavities 531-532 in order to allow the holding of the pedal rod 530 in one of two modes, by the fork of the tricycle. For example, in the first mode, the pedal rod 530 may be held, by the fork, about the cavity 531 while engaging the protrusion 533 in rotational control of the front wheel, thus, allowing the pedaling of the front wheel. For example, in the second mode, the pedal rod 530 may be held, by the fork, about the cavity 532 while disengaging the protrusion 533 from rotational control of the front wheel, thus, allowing the pedal 131 to rotate freely without rotating the front wheel. In one embodiment, each pedal may have 3 modes: 1. Engaged with the front wheel—pedaling the pedal rotates the front wheel; 2. Disengaged from the front wheel—the pedal may rotate freely without rotating the front wheel, or vice versa—the front wheel may rotate freely without rotating the pedal; 3. Taken away from the front wheel—the pedal may be detached from the tricycle by detaching and taking out the pedal rod from the tricycle.

Figure 20:
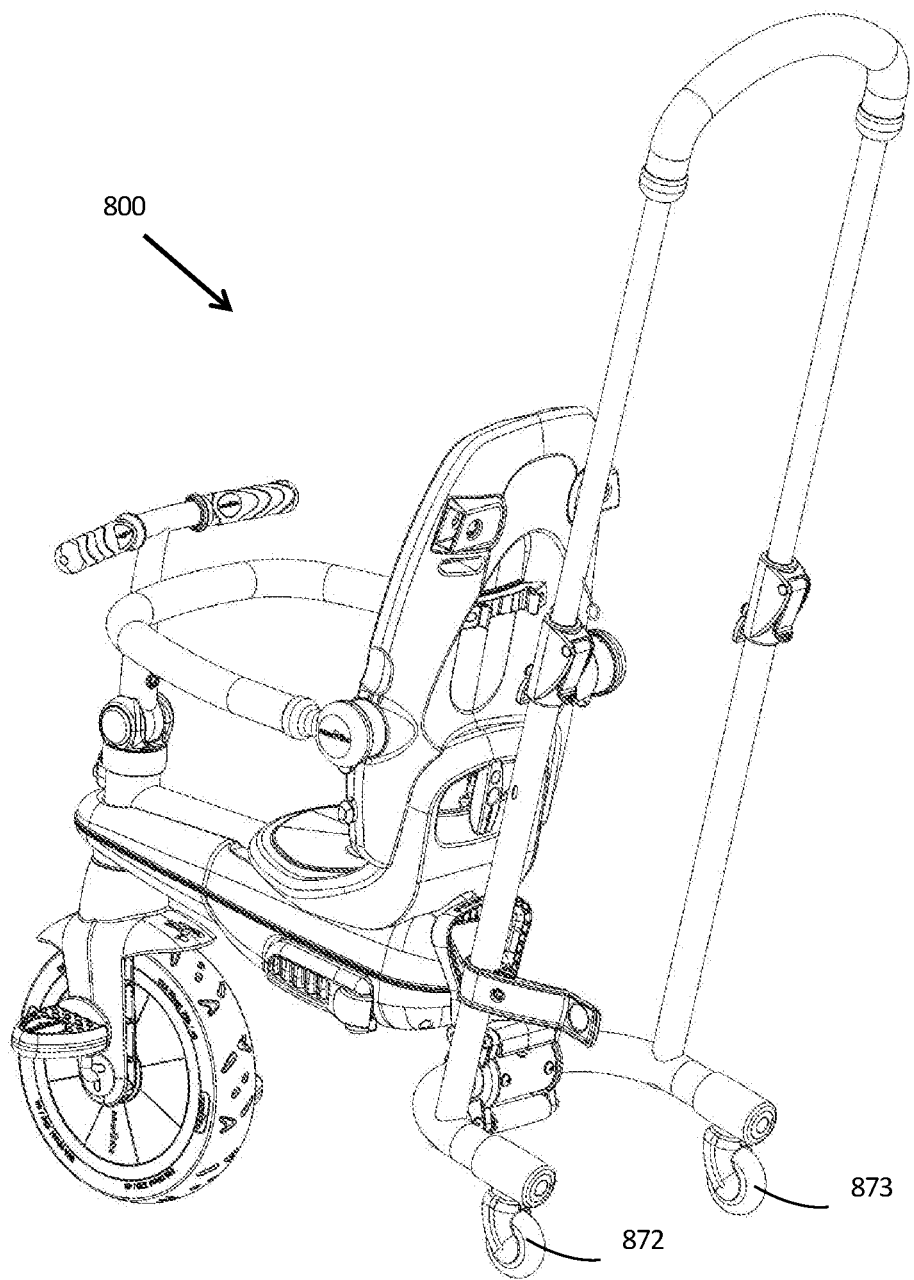
FIG. 20 is an isometric rear-view diagram depicting a foldable tricycle, with 2 rear swivel wheels, according to another embodiment of the invention.

FIG. 20 is an isometric rear-view diagram depicting a foldable tricycle, with 2 rear swivel wheels, according to another embodiment of the invention. In this embodiment, the depicted tricycle 800 has two rear swivel wheels 872-873, i.e. crazy wheels, for easy steerability in the second mode. During the second mode, when an attendant pushes the tricycle from behind, the tricycle may be steered by the attendant from behind by pushing the tricycle left and right and where the rear swivel wheels 872-873 align themselves left or right accordingly. Thus, in this embodiment, the foldable tricycle may also be operable between a first mode of operation steerable by the tricycle rider, and a second mode of operation steerable by an attendant pushing the tricycle.

For the sake of brevity, a description is set forth, for the configuration of one of the rear swivel wheels, although the description is meant to include each one of the rear swivel wheels individually. The central axis of the axel that swivels the rear wheel extends in an offset from rotational axis of rear wheel by a distance. In one embodiment, the rear offset distance is in a range of about 15 mm and 40 mm. In one embodiment, the rear offset distance is in a range of about 80 mm and 180 mm. In another embodiment, the rear offset distance is in a range of about 10 mm and 200 mm. In another embodiment, the rear offset distance is in a range is at least 50 mm. As the offset distance decreases with all else equal, so to decreases an ability to turn the tricycle from behind using the hand grip. This combination of geometries is exemplary of a configuration that may permit an attendant to steer, in the second mode, or may permit the tricycle rider to steer, in the first mode.

The front wheel, may be configured to be rotationally coupled with the rider handle in a manner permitting a tricycle rider to exert forces on the rider handle and thereby turn the fork. The front wheel, in the second mode, may be configured to be rotationally fixed, preventing forces from turning the front wheel left or right. Rotational Fixing of the font wheel may be accomplished in numerous mechanical ways, and the invention, in its broadest sense, is not limited to any particular mechanical interconnection. Rather, any manner in which the front wheel may be fixed to roll in a straight direction, back and forth, is considered to fall within the scope and spirit of the invention. Moreover, the location of a fixing mechanism is not necessarily critical to embodiments of the invention. It may be located between a rider handle and the front wheel, or at any other place.

Figure 21:
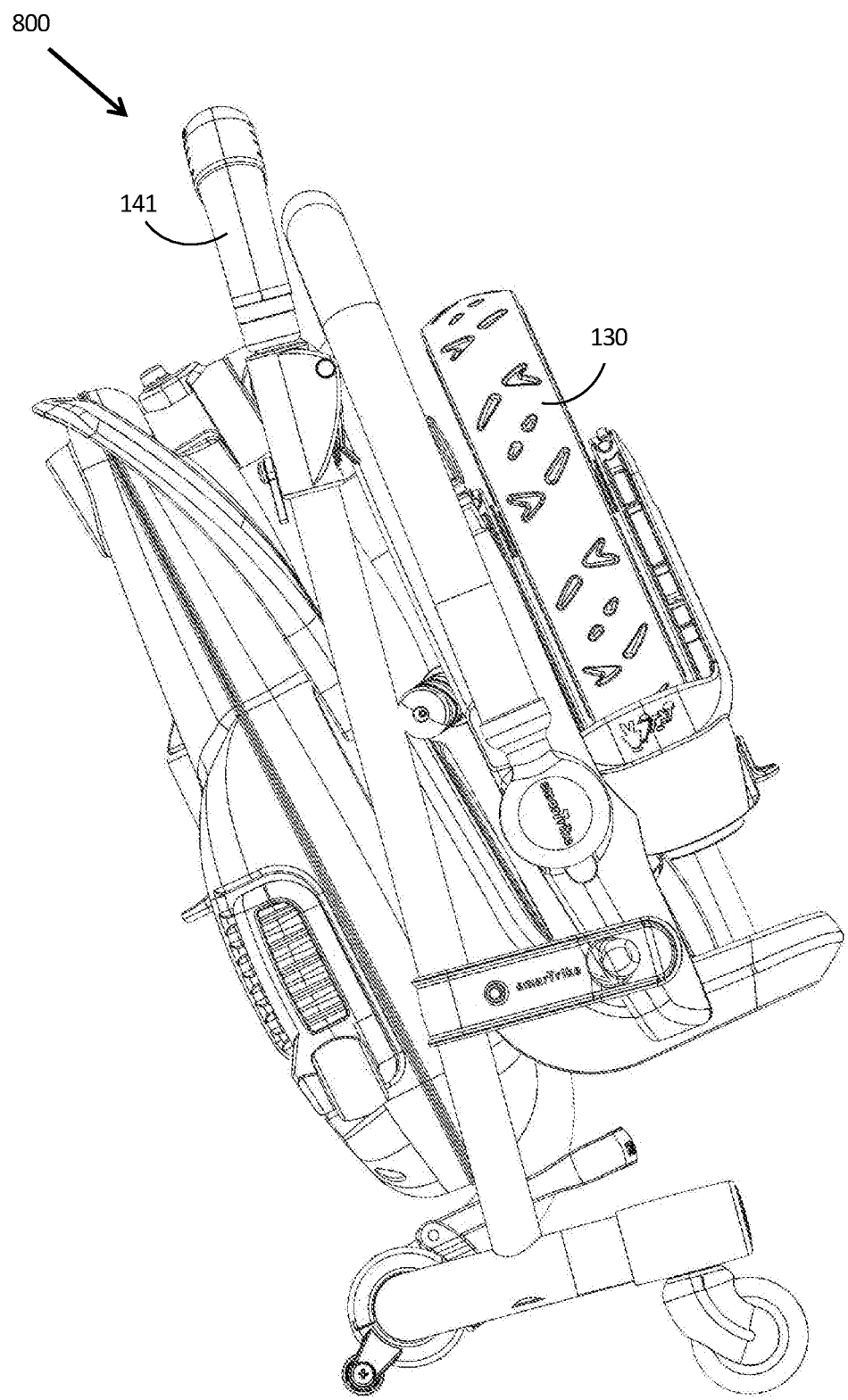
FIG. 21 is a right-view diagram depicting the foldable tricycle, with the 2 rear swivel wheels, in a folded position, according to an embodiment.

FIG. 21 is a right-view diagram depicting the foldable tricycle, with the 2 rear swivel wheels, in a folded position, according to an embodiment. In this folded position, the parental handle 141 may be rotated under the tricycle 800 toward the front of the tricycle, effectively rotating the attached rear support in relations to the frame. In this embodiment, the front wheel 130 may be detached from the tricycle 800, when folded, and attached to the back of the back support. In another embodiment, the front wheel 130 may be detached from the tricycle 800, when folded, and inserted in a pocket (not shown), made of cloth or any other material, attached to the back of the back support. In one embodiment, the tricycle 800 may be folded together with its arm rest. In one embodiment, the tricycle 800 may be folded together with its canopy. In one embodiment, the tricycle 800 may be folded together with its rear bag. In yet another embodiment the tricycle 800 may be folded together with the parental handle 141. In yet another embodiment the tricycle 800 may be folded together with the parental handle 141 and the arm rest. In yet another embodiment the tricycle 800 may be folded together with all its depicted parts, including its arm rest, its canopy, and its rear bag. In one embodiment, in the folded position, the overall dimensions (width*height*length) of the folded tricycle may be less than 20% of the overall dimensions of the open tricycle. In one embodiment, the dimensions of the open tricycle are less than 99×44×101 cm. In one embodiment, the dimensions of the trolley like folded tricycle are less than 44×35×99 cm. In one embodiment, the dimensions of the folded tricycle are less than 44×35×61 cm. In one embodiment, the dimensions of the folded tricycle, with its rear wheels detached, are less than 33×33×61 cm. In one embodiment, the dimensions of the open tricycle are less than 98×49×101 cm. In one embodiment, the dimensions of the trolley like folded tricycle are less than 49×35×104 cm. In one embodiment, the dimensions of the folded tricycle are less than 49×35×64 cm. In one embodiment, the dimensions of the folded tricycle, with its rear wheels detached, are less than 37×34×62 cm. In one embodiment, the total dimensions, meaning the width plus length plus height, of the folded tricycle do not exceed 150 cm.

While the above description discloses many embodiments and specifications of the invention, these were described by way of illustration and should not be construed as limitations on the scope of the invention. The described invention may be carried into practice with many modifications which are within the scope of the appended claims.

The invention claimed is:

1. A foldable tricycle, operable between a first mode of operation steerable by a tricycle rider, and a second mode of operation steerable by an attendant pushing the tricycle, the tricycle comprising:
   first and second rear wheels and a rear support, the rear support has a first side, a second side and a main support area positioned between the first and second sides, where the first rear wheel is supported by a rear support's first side distal end area and the second rear wheel is supported by the rear support's second side distal end area;
   a front wheel having a front wheel axis;
   a pair of pedals, each pedal configured for connection about said front wheel axis to rotate said front wheel;
   a head tube;
   a fork for rotatably supporting said front wheel in a manner permitting said front wheel to rotate about said front wheel axis;
   a foldable seat, comprising a chair and a back support, for accommodating said tricycle rider;
   a parental handle, for steering said tricycle by said attendant pushing the tricycle in the second mode, the parental handle has a first extendable arm and a second extendable arm, the first and second extendable arms are spaced apart, the first extendable arm and the second extendable arm each has a proximal end and a distal end, the first extendable arm's proximal end is connected to said rear support's first side between the first side distal end area and the main support area, and the second extendable arm's proximal end is connected to said rear support's second side between the second side distal end area and the main support area, and a top end which connects the distal ends of the first and second extendable arms;

a rider handle, configured to turn the fork in a manner permitting a tricycle rider to exert forces on the rider handle and thereby turn the fork;

a main frame, configured to rotatably hold said rear support at the main support area, to support said foldable seat, to rotatably support said rider handle, to rotatably support said fork;

a latching mechanism, capable of locking and unlocking the rotatable movement, of said rear support in relations to said main frame; and wherein unlocking the latching mechanism permits said parental handle to be folded in relation to said frame.

2. A foldable tricycle according to claim 1, where the tricycle further comprises a rear bag.

3. A foldable tricycle according to claim 1, where the tricycle further comprises a canopy.

4. A foldable tricycle according to claim 1, where the latching mechanism has a grip.

5. A foldable tricycle according to claim 1, where the latching mechanism comprises a bolt.

6. A foldable tricycle according to claim 5, where the latching mechanism also comprises a spring that pushes the bolt into place.

7. A foldable tricycle according to claim 1, where the front wheel is swivel wheel.

8. A foldable tricycle according to claim 1, where at least one of the rear wheels is a swivel wheel.

9. A foldable tricycle according to claim 1, where both the rear wheels are swivel wheels.

10. A foldable tricycle according to claim 1, where the total dimensions of said folded tricycle do not exceed 150 cm.

11. A foldable tricycle according to claim 1, where the hand rest is detachable.

12. A foldable tricycle according to claim 1, where said tricycle is folded into a trolley like folded position.

13. A foldable tricycle according to claim 12, where the tricycle has an auxiliary wheel, for providing easier rolling when the folded tricycle is in a trolley like folded position.

14. A foldable tricycle according to claim 1, where the seat can be turned around in 180°.

15. A foldable tricycle according to claim 1, where the tricycle further comprises a leg rest.

16. A foldable tricycle according to claim 1, where the tricycle further comprises a fastener and a pin for holding the tricycle in the folded position.

\* \* \* \* \*